US012574337B2

(12) United States Patent
Peng et al.

(10) Patent No.: US 12,574,337 B2
(45) Date of Patent: Mar. 10, 2026

(54) COMPUTING POWER RESOURCE SCHEDULING METHOD AND RELATED APPARATUS

(71) Applicant: Huawei Technologies Co., Ltd., Shenzhen (CN)

(72) Inventors: Chenghui Peng, Shanghai (CN); Zhe Liu, Shanghai (CN); Jianjun Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 125 days.

(21) Appl. No.: 18/522,367

(22) Filed: Nov. 29, 2023

(65) Prior Publication Data

US 2024/0106764 A1     Mar. 28, 2024

Related U.S. Application Data

(63) Continuation of application No. PCT/CN2022/088070, filed on Apr. 21, 2022.

(30) Foreign Application Priority Data

May 31, 2021     (CN) .......................... 202110602003.2

(51) Int. Cl.
*G06F 1/00*          (2006.01)
*G06F 9/50*          (2006.01)
(Continued)

(52) U.S. Cl.
CPC ............ *H04L 47/82* (2013.01); *G06F 9/5094* (2013.01); *G06F 1/3203* (2013.01)

(58) Field of Classification Search
CPC . H04L 47/82; H04L 41/5051; H04L 41/0806; H04L 41/0823; H04L 41/14;
(Continued)

(56) References Cited

U.S. PATENT DOCUMENTS 9,510,303 B2 * 11/2016 Chen ................... H04W 52/245
10,075,260 B2 * 9/2018 Lv ..................... H04L 25/03006
(Continued)

FOREIGN PATENT DOCUMENTS

CN          105589506 A          5/2016
CN          111869303 A          10/2020
CN          112188547 A          1/2021

OTHER PUBLICATIONS

Daiwk-Github, Federated learning, SRC:https://ai.googleblog.com/2017/04/federated-learning-collaborative.html,Jan. 1, 1970,with English translation total 8 pages.
(Continued)

*Primary Examiner* — Volvick Derose
(74) *Attorney, Agent, or Firm* — Slater Matsil, LLP

(57)          ABSTRACT

A first terminal device sends a computing power request message to the first device, where the computing power request message includes computing plane resource indication information, and the computing plane resource indication information indicates a computing power requirement of the first terminal device; and receives computing power configuration information sent by the first device, where the computing power configuration information includes first indication information and/or second indication information, the first indication information indicates a first computing power resource provided by the first device, the second indication information indicates a second computing power resource provided by the second device, and the first device is different from the second device.

19 Claims, 14 Drawing Sheets

(51) Int. Cl.
*H04L 47/70* (2022.01)
*G06F 1/3203* (2019.01)

(58) Field of Classification Search
CPC ....... H04L 41/16; G06F 9/5094; G06N 20/00;
H04W 24/02
USPC ........................................................ 713/300
See application file for complete search history.

(56) References Cited

U.S. PATENT DOCUMENTS

| | | | | |
|---|---|---|---|---|
| 2009/0193268 A1* | 7/2009 | Kreiner | .............. | H04L 12/40045 |
| | | | | 713/300 |
| 2013/0054988 A1* | 2/2013 | Litovtchenko | ........ | G06F 1/3203 |
| | | | | 713/300 |
| 2015/0195791 A1* | 7/2015 | Jiang | ................... | H04W 52/243 |
| | | | | 455/522 |
| 2016/0295504 A1* | 10/2016 | Wang | ................... | H04W 68/02 |
| 2016/0343416 A1* | 11/2016 | Chang | ................. | G11C 11/4074 |
| 2018/0054589 A1* | 2/2018 | Park | ....................... | G09G 5/008 |
| 2018/0132196 A1* | 5/2018 | Yang | ................... | H04B 17/318 |
| 2020/0076875 A1* | 3/2020 | Sabella | ............. | H04W 28/0205 |
| 2023/0128935 A1* | 4/2023 | Kim | ...................... | G06F 1/3215 |
| | | | | 713/300 |
| 2023/0276430 A1* | 8/2023 | Hong | ................... | H04W 72/20 |
| 2025/0091459 A1* | 3/2025 | Son | ...................... | B60L 53/305 |

OTHER PUBLICATIONS

Network Data Analytics Function (NWDAF), Built for 5G Data Insights,a.amdocs,Jun. 18, 2021, total 9 pages.

* cited by examiner

COMPUTING POWER RESOURCE SCHEDULING METHOD AND RELATED APPARATUS

CROSS-REFERENCE TO RELATED APPLICATIONS

This application is a continuation of International Application No. PCT/CN2022/088070, filed on Apr. 21, 2022, which claims priority to Chinese Patent Application No. 202110602003.2, filed on May 31, 2021. The disclosures of the aforementioned applications are hereby incorporated by reference in their entireties.

TECHNICAL FIELD

Embodiments of this application relate to the field of communication technologies, and specifically, to a computing power resource scheduling method and a related apparatus.

BACKGROUND

An existing wireless network mainly provides a connection service, and a wireless network architecture mainly resolves a connection service problem between terminals or between a terminal and a server. In addition, with the emergence of new scenarios and requirements such as real-time artificial intelligence (AI) and high data privacy protection for a future wireless network, the wireless network architecture needs to support a direct AI collaboration mechanism between devices natively.

However, in an existing wireless network architecture, a corresponding network data analytics function (NWDAF) network element mainly collects data from a terminal, an NF network element, a base station, and the like, learns a model through data analysis, and provides an AI optimization service such as data analysis for the NF network element, the base station, and the like. However, in such a system architecture, AI capabilities of network functions such as the terminal and the base station are not fully used, and AI collaboration between devices such as a network device and a terminal device in a wireless network cannot be well supported. A low-latency AI service cannot be quickly and timely responded. In addition, when an NWDAF network element collects data from the terminal or another network function, data privacy may be affected.

Therefore, in an AI scenario such as learning, incremental learning, or inference that requires a large amount of computing power suddenly, when computing power resources of the terminal device are insufficient, an existing NWDAF network element cannot well support AI collaboration between devices such as the network device and the terminal device in the wireless network.

SUMMARY

Embodiments of this application provide a computing power resource scheduling method and a related apparatus, so that the first terminal device requests a corresponding computing power resource from a first device when a computing power resource of a first terminal device is insufficient to support AI collaboration with another network device, so that the first terminal device can have a sufficient computing power resource to support the AI collaboration with the another network device.

According to a first aspect, an embodiment of this application provides a computing power resource scheduling method, where the method may be applied to a first terminal device, and the method may include: sending a computing power request message to a first device, where the computing power request message includes computing plane resource indication information, and the computing plane resource indication information indicates a computing power requirement of the first terminal device; and receiving computing power configuration information sent by the first device, where the computing power configuration information includes first indication information and/or second indication information, the first indication information indicates a first computing power resource provided by the first device, the second indication information indicates a second computing power resource provided by a second device, and the first device is different from the second device.

In the foregoing manner, when the computing power resource of the first terminal device is insufficient to support AI collaboration with another network device, the first terminal device may send the computing power request message to the first device, so that the first device determines the first computing power resource based on the computing plane resource indication information in the computing power request message and the computing plane remaining computing resource of the first device. Then, the first device sends corresponding computing power configuration information to the first terminal device, where the computing power configuration information includes the first indication information and/or the second indication information. In this way, the first terminal device may obtain support of the first computing power resource from the first device based on the first indication information, and/or obtain support of the second computing power resource from the second device based on the second indication information, to support the AI collaboration with the another network device.

Optionally, in some embodiments, the first device is a first base station, and the sending a computing power request message to a first device may include: sending the computing power request message to the first device by using air interface RRC signaling.

Optionally, in some other embodiments, the first device is a core network device, and the sending a computing power request message to a first device may include: sending the computing power request message to the first device by using NAS signaling.

Optionally, in some other embodiments, the first device is a first base station, and the receiving computing power configuration information sent by the first device may include: receiving the computing power configuration information sent by the first device by using the air interface RRC signaling.

Optionally, in some other embodiments, the first device is a core network device, and the receiving computing power configuration information sent by the first device may include: receiving the computing power configuration information sent by the first device by using the NAS signaling.

Optionally, in some embodiments, the computing plane resource indication information includes one or more of a computing power size, an execution time, a computing power task type, a computing model, a computing algorithm, an execution result transmission trigger type, and a trigger type.

According to a second aspect, an embodiment of this application provides another computing power resource scheduling method, where the method may be applied to a first device, the first device may include a first base station or a core network device, and the method may include: receiving a computing power request message sent by a first terminal device, where the computing power request message includes computing plane resource indication information, and the computing plane resource indication information indicates a computing power requirement of the first terminal device; determining a first computing power resource based on the computing plane resource indication information and a computing plane remaining computing resource of the first device; and sending computing power configuration information to the first terminal device, where the computing power configuration information includes first indication information and/or second indication information, the first indication information indicates the first computing power resource provided by the first device, the second indication information indicates a second computing power resource provided by a second device, and the first device is different from the second device.

Optionally, in some embodiments, the method may further include: sending a computing power transfer request message to the second device, to indicate the computing power requirement of the first terminal device or a computing power requirement of the first device; and receiving a computing power transfer acknowledgment message sent by the second device, where the computing power transfer acknowledgment message includes the second indication information.

Optionally, in some embodiments, the first device includes a first base station, and the second device includes a second base station; and the sending a computing power transfer request message to the second device includes: sending the computing power transfer request message to the second device by using X2 interface signaling.

Optionally, in some embodiments, the first device includes a first base station, and the second device includes a second base station; and the receiving a computing power transfer acknowledgment message sent by the second device includes: receiving the computing power transfer acknowledgment message sent by the second device by using the X2 interface signaling.

Optionally, in some embodiments, the first device includes a first base station, and the second device includes a core network device; and the sending a computing power transfer request message to the second device includes: sending the computing power transfer request message to the second device by using N2 interface signaling.

Optionally, in some embodiments, the first device includes a first base station, and the second device includes a core network device; and the receiving a computing power transfer acknowledgment message sent by the second device may include: receiving the computing power transfer acknowledgment message sent by the second device by using the N2 interface signaling.

Optionally, in some embodiments, the first device is the first base station, and the receiving a computing power request message sent by a first terminal device includes: receiving the computing power request message sent by the first terminal device by using air interface RRC signaling.

Optionally, in some embodiments, the first device is the first base station, and the sending computing power configuration information to the first terminal device includes: sending the computing power configuration information to the first terminal device by using the air interface RRC signaling.

Optionally, in some embodiments, the first device is a core network device, and the second device includes a first base station; and the receiving a computing power request message sent by the first terminal device includes: receiving the computing power request message sent by the first terminal device by using NAS signaling.

Optionally, in some embodiments, the first device is a core network device, and the second device includes a first base station; and the sending computing power configuration information to the first terminal device includes: sending the computing power configuration information to the first terminal device by using the NAS signaling.

Optionally, in some embodiments, the first device includes a first base station, and the second device includes a second terminal device; and the sending a computing power transfer request message to the second device includes: sending the computing power transfer request message to the second device by using the air interface RRC signaling.

Optionally, in some embodiments, the first device includes a first base station, and the second device includes a second terminal device; and the receiving a computing power transfer acknowledgment message sent by the second device may include: receiving the computing power transfer acknowledgment message sent by the second device by using the air interface RRC signaling.

Optionally, in some embodiments, the computing plane resource indication information includes one or more of a computing power size, an execution time, a computing power task type, a computing model, a computing algorithm, an execution result transmission trigger type, and a trigger type.

According to a third aspect, an embodiment of this application provides another computing power resource scheduling method, where the method may be applied to a second device, and the method may include: receiving a computing power transfer request message sent by a first device; determining a second computing power resource based on the computing power transfer request message and a computing plane remaining computing resource of the second device; and sending a computing power transfer acknowledgment message to the first device, where the computing power transfer acknowledgment message includes second indication information, and the second indication information indicates the second computing power resource provided by the second device.

Optionally, in some embodiments, the first device includes a first base station, and the second device includes a second base station; and the receiving a computing power transfer request message sent by a first device includes: receiving the computing power transfer request message sent by the first device by using X2 interface signaling.

Optionally, in some embodiments, the first device includes a first base station, and the second device includes a second base station; and the sending a computing power transfer acknowledgment message to the first device includes: sending the computing power transfer acknowledgment message to the first device by using X2 interface signaling.

Optionally, in some embodiments, the first device includes a first base station, and the second device includes a core network device; and the receiving a computing power transfer request message sent by a first device includes: receiving the computing power transfer request message sent by the first device by using N2 interface signaling.

Optionally, in some embodiments, the first device includes a first base station, and the second device includes a core network device; and the sending a computing power transfer acknowledgment message to the first device includes: sending the computing power transfer acknowledgment message to the first device by using N2 interface signaling.

Optionally, in some embodiments, the first device includes a first base station, and the second device includes a second terminal device; and the receiving a computing power transfer request message sent by a first device includes: receiving the computing power transfer request message sent by the first device by using air interface RRC signaling.

Optionally, in some embodiments, the first device includes a first base station, and the second device includes a second terminal device; and the sending a computing power transfer acknowledgment message to the first device may include: sending the computing power transfer acknowledgment message to the first device by using the air interface RRC signaling.

According to a fourth aspect, an embodiment of this application provides a first terminal device, where the first terminal device may include: a sending unit, configured to send a computing power request message to a first device, where the computing power request message includes computing plane resource indication information, and the computing plane resource indication information indicates a computing power requirement of the first terminal device; and a receiving unit, configured to receive computing power configuration information sent by the first device, where the computing power configuration information includes first indication information and/or second indication information, the first indication information indicates a first computing power resource provided by the first device, the second indication information indicates a second computing power resource provided by a second device, and the first device is different from the second device.

Optionally, in some embodiments, the first device is a first base station; and the sending unit is configured to send the computing power request message to the first device by using air interface RRC signaling.

Optionally, in some embodiments, the first device is a first base station; and the receiving unit is configured to receive the computing power configuration information sent by the first device by using the air interface RRC signaling.

Optionally, in some embodiments, the first device is a core network device; and the sending unit is configured to send the computing power request message to the first device by using NAS signaling.

Optionally, in some embodiments, the first device is a core network device; and the receiving unit is configured to receive the computing power configuration information sent by the first device by using the NAS signaling.

Optionally, in some embodiments, the computing plane resource indication information includes one or more of a computing power size, an execution time, a computing power task type, a computing model, a computing algorithm, an execution result transmission trigger type, and a trigger type.

According to a fifth aspect, an embodiment of this application provides a first device, where the first device may include: an obtaining module, configured to receive a computing power request message sent by a first terminal device, where the computing power request message includes computing plane resource indication information, and the computing plane resource indication information indicates a computing power requirement of the first terminal device; a processing module, configured to determine a first computing power resource based on the computing plane resource indication information and a computing plane remaining computing resource of the first device; and a sending module, configured to send computing power configuration information to the first terminal device, where the computing power configuration information includes first indication information and/or second indication information, the first indication information indicates the first computing power resource provided by the first device, the second indication information indicates a second computing power resource provided by a second device, and the first device is different from the second device.

Optionally, in some embodiments, the sending module is configured to send a computing power transfer request message to the second device, to indicate the computing power requirement of the first terminal device or a computing power requirement of the first device; and the obtaining module is configured to receive a computing power transfer acknowledgment message sent by the second device, where the computing power transfer acknowledgment message includes the second indication information.

Optionally, in some embodiments, the first device includes a first base station, and the second device includes a second base station; and the sending module is configured to send the computing power transfer request message to the second device by using X2 interface signaling.

Optionally, in some embodiments, the first device includes a first base station, and the second device includes a second base station; and the obtaining module is configured to receive the computing power transfer acknowledgment message sent by the second device by using the X2 interface signaling.

Optionally, in some embodiments, the first device includes a first base station, and the second device includes a core network device; and the sending module is configured to send the computing power transfer request message to the second device by using N2 interface signaling.

Optionally, in some embodiments, the first device includes a first base station, and the second device includes a core network device; and the obtaining module is configured to receive the computing power transfer acknowledgment message sent by the second device by using the N2 interface signaling.

Optionally, in some embodiments, the first device is the first base station; and the obtaining module is configured to receive the computing power request message sent by the first terminal device by using air interface RRC signaling.

Optionally, in some embodiments, the first device is the first base station; and the sending module is configured to send the computing power configuration information to the first terminal device by using the air interface RRC signaling.

Optionally, in some embodiments, the first device is a core network device, and the second device includes a first base station and/or a second base station; and the obtaining module is configured to receive the computing power request message sent by the first terminal device by using NAS signaling.

Optionally, in some embodiments, the first device is a core network device, and the second device includes a first base station; and the sending module is configured to send the computing power configuration information to the first terminal device by using the NAS signaling.

Optionally, in some embodiments, the first device includes a first base station, and the second device includes a second terminal device; and the sending module is configured to send the computing power transfer request message to the second device by using the air interface RRC signaling.

Optionally, in some embodiments, the first device includes a first base station, and the second device includes a second terminal device; and the obtaining module is configured to receive the computing power transfer acknowledgment message sent by the second device by using the air interface RRC signaling.

Optionally, in some embodiments, the computing plane resource indication information includes one or more of a computing power size, an execution time, a computing power task type, a computing model, a computing algorithm, an execution result transmission trigger type, and a trigger type.

According to a sixth aspect, an embodiment of this application provides a second device, where the second device may include: a first receiving module, configured to receive a computing power transfer request message sent by a first device; a first processing module, configured to determine a second computing power resource based on the computing power transfer request message and a computing plane remaining computing resource of the second device; and a first sending module, configured to send a computing power transfer acknowledgment message to the first device, where the computing power transfer acknowledgment message includes second indication information, and the second indication information indicates the second computing power resource provided by the second device.

Optionally, in some embodiments, the first receiving module is configured to receive the computing power transfer request message sent by the first device by using X2 interface signaling.

Optionally, in some embodiments, the first device includes a first base station, and the second device includes a second base station; and the first sending module is configured to send the computing power transfer acknowledgment message to the first device by using the X2 interface signaling.

Optionally, in some embodiments, the first receiving module is configured to receive the computing power transfer request message sent by the first device by using N2 interface signaling.

Optionally, in some embodiments, the first device includes a first base station, and the second device includes a core network device; and the first sending module is configured to send the computing power transfer acknowledgment message to the first device by using the N2 interface signaling.

Optionally, in some embodiments, the first device includes a first base station, and the second device includes a second terminal device; and the first receiving module is configured to receive the computing power transfer request message sent by the first device by using air interface RRC signaling.

Optionally, in some embodiments, the first device includes a first base station, and the second device includes a second terminal device; and the first sending module is configured to send the computing power transfer acknowledgment message to the first device by using the air interface RRC signaling.

According to a seventh aspect, an embodiment of this application provides a first terminal device, where the first terminal device may include a memory, configured to store computer-readable instructions. The first terminal device may further include a processor coupled to the memory, and configured to execute the computer-readable instructions in the memory, to perform the method described in any one of the first aspect or the possible implementations of the first aspect.

According to an eighth aspect, an embodiment of this application provides a first device, where the first device may include a memory, configured to store computer-readable instructions. The first device may further include a processor coupled to the memory, and configured to execute the computer-readable instructions in the memory, to perform the method described in any one of the second aspect or the possible implementations of the second aspect.

According to a ninth aspect, an embodiment of this application provides a second device, where the second device may include a memory, configured to store computer-readable instructions. The second device may further include a processor coupled to the memory, and configured to execute the computer-readable instructions in the memory, to perform the method described in any one of the third aspect or the possible implementations of the third aspect.

According to a tenth aspect, an embodiment of this application provides a computer-readable storage medium, including instructions. When the instructions are run on a computer, the computer is enabled to perform the method according to the first aspect, the second aspect, or the third aspect, or any one of the possible implementations of the first aspect, the second aspect, or the third aspect.

According to an eleventh aspect, an embodiment of this application provides a computer program product including instructions. When the computer program product runs on a computer, the computer is enabled to perform the method according to the first aspect, the second aspect, or the third aspect, or any one of the possible implementations of the first aspect, the second aspect, or the third aspect.

A twelfth aspect of this application provides a chip system. The chip system may include a processor, configured to support a first terminal device in implementing functions in the method described in the first aspect or any one of the possible implementations of the first aspect, or support a first device in implementing functions in the method described in the second aspect or any one of the possible implementations of the second aspect, or support a second device in implementing functions in the method described in the third aspect or any one of the possible implementations of the third aspect.

Optionally, with reference to the twelfth aspect, in a first possible implementation, the chip system may further include a memory, and the memory is configured to store program instructions and data that are necessary for the first terminal device, the first device, and the second device. The chip system may include a chip, or may include a chip and another discrete component. The chip system may include an application-specific integrated circuit (ASIC), a field programmable gate array (FPGA), another programmable logic device, or the like. Further, the chip system may further include an interface circuit and the like.

Technical effects obtained in the fourth aspect, the seventh aspect, and the tenth aspect to the twelfth aspect are similar to technical effects obtained by using corresponding technical means in the first aspect. Details are not described herein again.

Technical effects obtained in the fifth aspect, the eighth aspect, and the tenth aspect to the twelfth aspect are similar to technical effects obtained by using corresponding technical means in the second aspect. Details are not described herein again.

Technical effects obtained in the sixth aspect, the ninth aspect, and the tenth aspect to the twelfth aspect are similar to technical effects obtained by using corresponding technical means in the third aspect. Details are not described herein again.

According to the foregoing technical solutions, it can be learned that embodiments of this application have the following advantages:

In this embodiment of this application, when the computing power resource of the first terminal device is insufficient to support AI collaboration with another network device, the first terminal device may send the computing power request message to the first device, so that the first device determines the first computing power resource based on the computing plane resource indication information in the computing power request message and the computing plane remaining computing resource of the first device. Then, the first device sends corresponding computing power configuration information to the first terminal device, where the computing power configuration information includes the first indication information and/or the second indication information. In this way, the first terminal device may obtain support of the first computing power resource from the first device based on the first indication information, and/or obtain support of the second computing power resource from the second device based on the second indication information, to support the AI collaboration with the another network device.

BRIEF DESCRIPTION OF THE DRAWINGS

To describe the technical solutions in embodiments of this application more clearly, the following briefly describes the accompanying drawings for describing embodiments. It is clear that the accompanying drawings in the following description show merely some embodiments of this application.

DETAILED DESCRIPTION OF ILLUSTRATIVE EMBODIMENTS

Embodiments of this application provide a computing power resource scheduling method and a related apparatus, so that the first terminal device requests a corresponding computing power resource from a first device and/or a second device when a computing power resource of a first terminal device is insufficient to support AI collaboration with another network device, so that the first terminal device can have a sufficient computing power resource to support the AI collaboration with the another network device.

The following clearly and completely describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of this application described herein can be implemented in orders except the order illustrated or described herein. Moreover, the terms "include", "have", or any other variant thereof are intended to cover non-exclusive inclusion. In this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one of a, b, or c may represent: a, b, c, a and b, a and c, b and c, or a, b, and c, where a, b, and c may be singular or plural. It should be noted that "at least one item (piece)" may also be explained as "one item (piece) or more items (pieces)".

Figures 1A, 1B:
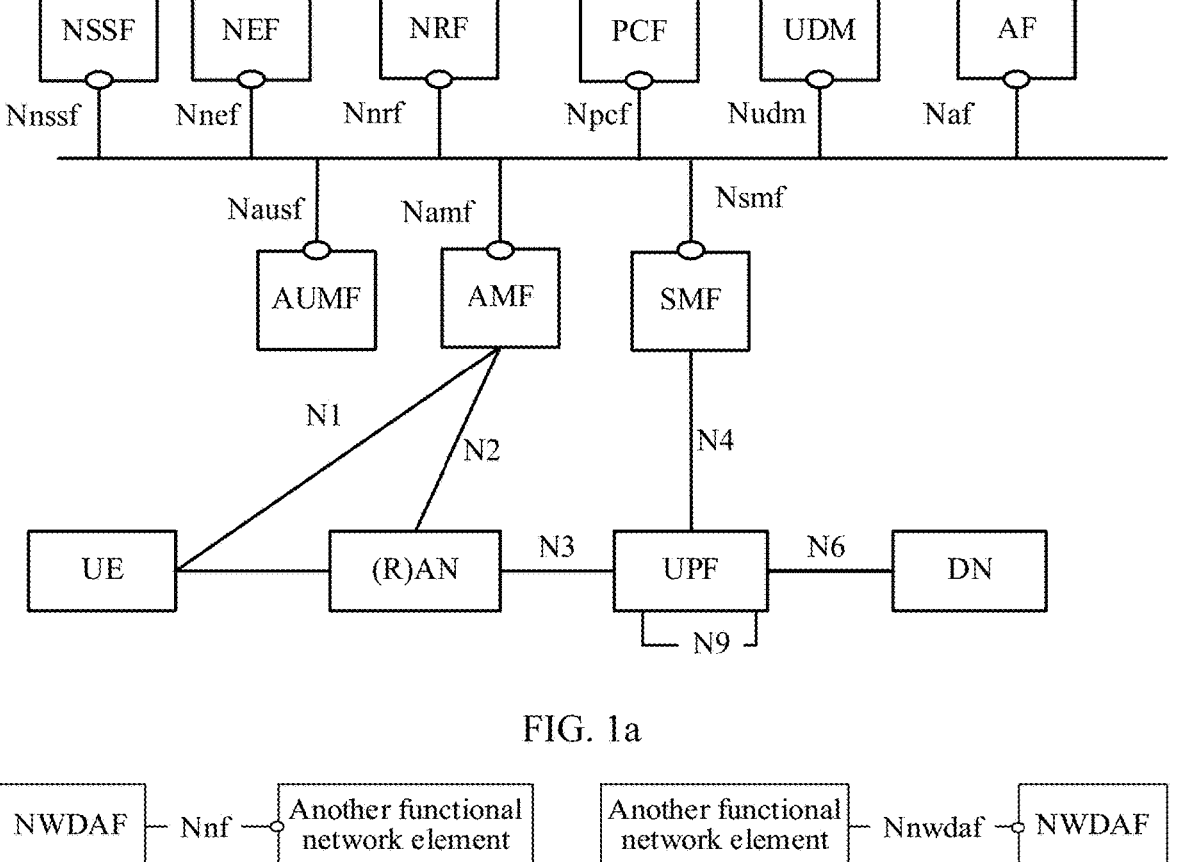
FIG. 1a is a schematic diagram of a system architecture according to an embodiment.
FIG. 1b is a schematic diagram of an interface.

An existing wireless network mainly provides a connection service, and a wireless network architecture mainly resolves a connection service problem between terminals or between a terminal and a server. In addition, with the emergence of new scenarios and requirements such as real-time AI and high data privacy protection for a future wireless network, the wireless network architecture needs to support a direct AI collaboration mechanism between devices natively. For details, refer to FIG. 1a. FIG. 1a is a schematic diagram of a system architecture according to an embodiment. As shown in FIG. 1a, the system architecture is a schematic diagram of a system architecture of a 5G network. The system architecture not only supports access to a core network side by using a radio technology defined in a 3GPP standard group, but also supports access to a core network side by using a non-3GPP access technology by using a non-3GPP interworking function (N3IWF), a next generation packet data gateway (ngPDG), a fixed network access gateway, or a trusted non-3GPP access gateway.

A user equipment (UE), a (radio) access network ((R) AN), a user plane function (UPF) network element, and a data network (DN) in FIG. is are generally referred to as user layer network functions or entities, and data traffic of a user may be transmitted through a data transmission channel established between the UE and the DN.

The UE may include: a handheld terminal, an in-vehicle device, a wearable device, a notebook computer, a subscriber unit, a cellular phone, a smartphone, a wireless data card, a personal digital assistant (PDA) computer, a tablet computer, a wireless modem, a handheld device, a laptop computer, a cordless telephone or a wireless local loop (WLL), a machine type communication (MTC) terminal, a customer-premises equipment (CPE), or other devices that can access the network. The UE and an access network device communicate with each other by using a radio technology.

An access network (AN) may also be referred to as a radio access network (RAN) in specific application. The RAN includes access network devices and is responsible for access of a user equipment. The RAN device in the 5G network may be a next generation (NG) RAN device, or may be an evolved universal terrestrial radio access network (E-UTRAN) device. The 5G network may be connected to both the foregoing two access network devices. In embodiments of this application, the RAN may be a next generation NodeB (gNB) or a next generation-evolved NodeB (ng-eNB). The gNB provides a user plane function and a control plane function of new radio (NR) for the UE, and the ng-eNB provides a user plane function and a control plane function of evolved universal terrestrial radio access (E-UTRA) for the UE. It should be noted that the gNB and the ng-eNB are merely names, are used to indicate base stations that support a 5G network system, and are not limited.

A data network (DN) may be an external network of an operator, or may be a network controlled by an operator, and is used to provide a service for a user. The UE may access the operator network so as to access the DN, and use a service provided by the operator or a third party on the DN.

Another network element in FIG. 1a is referred to as a control layer network function or entity, and is mainly responsible for user registration authentication, mobility management, delivering a data packet forwarding policy, a QoS control policy, or the like to a user plane function (UPF) network element. A session management function (SMF)

network element is mainly configured to be responsible for user plane network element selection, user plane network element redirection, internet protocol (IP) address assignment, bearer establishment, modification, and release, and the like. An access and mobility management function (AMF) network element is responsible for signaling processing, such as access control, mobility management, attach and detach, and network element selection.

Specifically, as shown in FIG. 1a, a user equipment UE may be connected to an AMF network element by using a RAN, the AMF network element is separately connected to network elements such as an SMF network element and a unified data management function (UDM), the SMF network element is connected to a UPF network element, and the UPF network element is connected to a DN. Interfaces and connections in the system architecture may include N1, N2, N3, N4, and N6. N1 is a control plane connection between the UE and the AMF network element, and is used to transmit control signaling between the user equipment and a core network control plane. Specifically, a message in the N1 connection may be transmitted by using a connection between the UE and the RAN and an N2 connection between the RAN and the AMF network element. N2 is a control plane connection between the RAN and the AMF network element. N3 is a connection between the RAN and the UPF network element. N4 is a connection between the SMF network element and the UPF network element, and is used to transmit control signaling between the SMF network element and the UPF network element. N6 is a connection between the UPF network element and the DN.

In addition, the control layer network function or entity may further include a policy control function (PCF) network element, which mainly supports to provide a unified policy framework to control a network behavior, provides a policy rule for the control layer network function, and is responsible for obtaining user subscription information related to a policy decision. An application function (AF) network element mainly supports interaction with a 3rd generation partnership project (3GPP) core network to provide a service, for example, affecting a data routing decision, a policy control function, or providing some third-party services for a network side. A network slice selection function (NSSF) network element is mainly configured to perform network slice selection. An authentication server function (AUSF) network element mainly provides identification and authorization functions. A unified data management (UDM) network element may be configured to perform location management and subscription management. A network exposure function (NEF) network element mainly supports secure interaction between a 3GPP network and a third-party application. The NEF can securely expose a network capability and an event to a third party, to enhance or improve application service quality. The 3GPP network can also securely obtain related data from the third party, to enhance intelligent decision-making of the network. In addition, the network element supports restoration of structured data from a unified database or storage of the structured data in the unified database.

It should be understood that although the NWDAF network element is not reflected in the system architecture shown in FIG. 1a, it may be understood that there may be direct interfaces between the NWDAF network element and all the functional network elements shown in FIG. 1a, and the direct interfaces are specifically represented as an Nnf interface and an Nnwdaf interface, as shown in a schematic diagram of an interface in FIG. 1b. It can be learned from part (a) in FIG. 1b that the NWDAF network element is connected to another functional network element by using an Nnf interface. The Nnf interface is mainly used by the NWDAF network element to request, from another functional network element (for example, an AMF network element or an SMF network element), subscription to data transmission in a specific context, cancel subscription to data transmission, request a specific report of data in a specific context, and the like. The system architecture shown in FIG. 1a further allows the NWDAF network element to obtain management data from OAM by invoking an Operations, Administration and Maintenance (OAM) operation and maintenance system service. In addition, it can be learned from part (b) in FIG. 1b that the Nnwdaf interface is used by the NWDAF network element to provide service for another functional network element, and is used by another network function to request, from the NWDAF, subscription to a network analysis transfer in a specific context, cancel subscription to a network analysis transfer, and request a specific report of a network analysis in a specific context.

However, in an existing wireless network architecture, a corresponding NWDAF network element mainly collects data from a terminal, another functional network element, a base station, and the like, learns a model through data analysis, and provides an AI optimization service such as data analysis for the another functional network element, the base station, and the like. However, in such a system architecture, AI capabilities of network functions such as the terminal and the base station are not fully used, and AI collaboration between devices such as a network device and a first terminal device in a wireless network cannot be well supported. A low-latency AI service cannot be quickly and timely responded. In addition, when an NWDAF network element collects data from the terminal or another network function, data privacy may be affected. Therefore, in an AI scenario such as learning, incremental learning, or inference that requires a large amount of computing power suddenly, when computing power resources of the first terminal device are insufficient, an existing NWDAF network element cannot well support AI collaboration between devices such as the network device and the first terminal device in the wireless network.

Figure 2A:
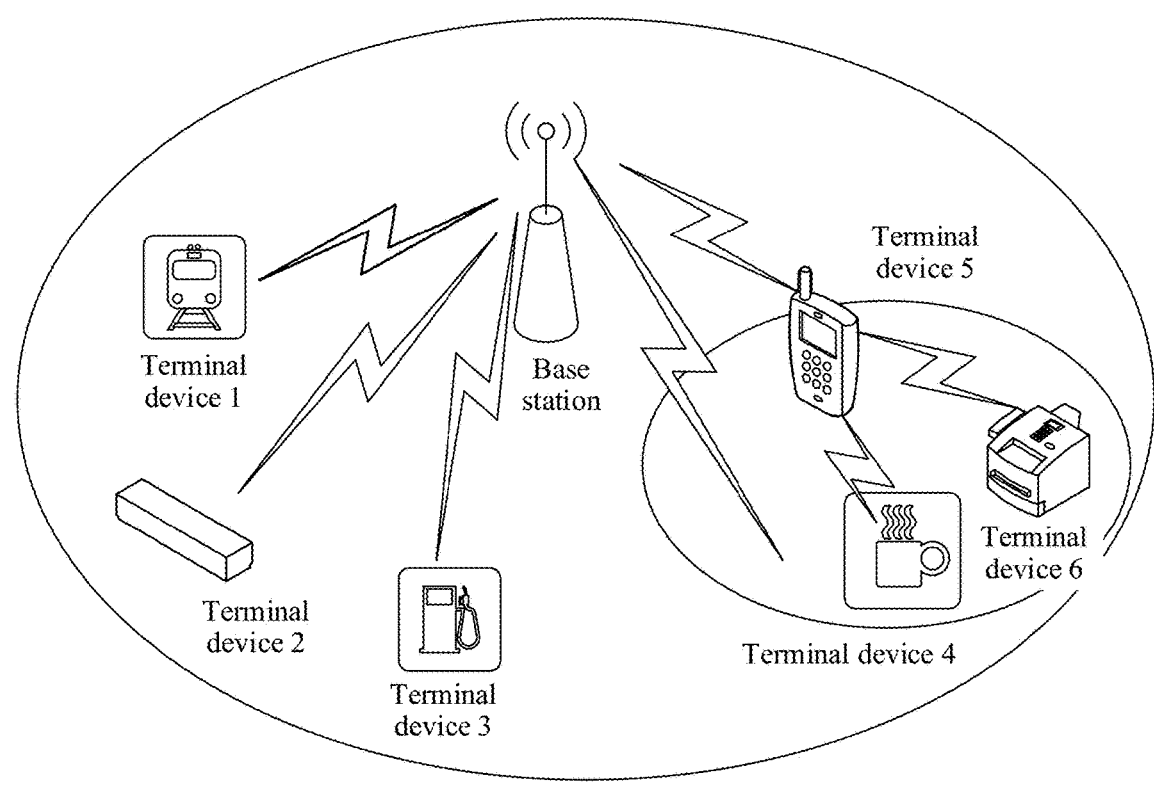
FIG. 2a is a schematic diagram of an architecture of a communication system according to an embodiment of this application.

To resolve the foregoing described problem, an embodiment of this application provides a computing power resource scheduling method. The computing power resource scheduling method may be applied to a wireless communication system such as 5G or satellite communication. When a computing power resource of a first terminal device is insufficient, a computing power resource may be requested from a base station, a core network device, or the like, to better support AI collaboration between devices such as a network device and a first terminal device in a wireless network. Refer to FIG. 2a. FIG. 2a is a schematic diagram of an architecture of a communication system according to an embodiment of this application. It can be learned from FIG. 2a that the communication system architecture usually includes cells. Each cell includes a base station (BS) and at least one terminal device (for example, a terminal device 1 to a terminal device 6). The base station may provide a base station that provides a communication service for the at least one terminal device. Therefore, when a computing power resource of the first terminal device is insufficient, the first terminal device may request a computing power resource from the base station that provides the communication service, so that the first terminal device can support AI collaboration between devices such as a network device and a first terminal device in a wireless network when the computing power resource is sufficient. The first terminal device may be understood as one of the at least one terminal device. This is not limited herein.

Figure 2B:
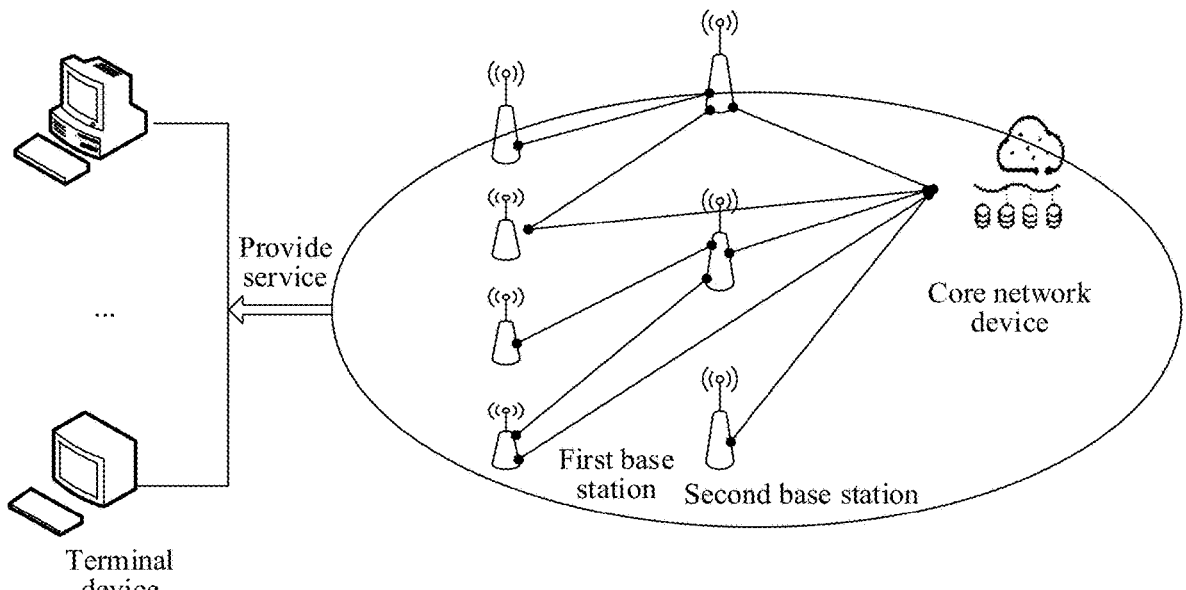
FIG. 2b is a schematic diagram of another communication architecture according to an embodiment of this application.

In addition, with the commercial deployment of a 5G network and the emergence of 5G industry applications, it is an inevitable trend to introduce computing power resources to the wireless network. An independent computing plane is introduced into a base station to provide a basic public computing service for other functions (such as control plane and user plane functions) of the base station and a third party outside the base station. In this way, functions (such as AI optimization network and perception capability) with real-time requirements are deployed in the base station, and AI industry applications, AR, and perception applications have continuous development. Specifically, refer to FIG. 2b. FIG. 2b is a schematic diagram of another communication architecture according to an embodiment of this application. It can be learned from FIG. 2b that the communication architecture may include at least one terminal device, at least one first base station, at least one second base station, and a core network device. The first base station may be understood as a base station that can currently directly provide a service for the first terminal device, and the second base station may be understood as a base station that currently does not directly provide a service for the first terminal device. In the communication architecture, an independent computing plane may be added to the first base station, the second base station, the second terminal device, and/or the core network device, to provide an independent AI computing power resource, and there is a logical interface between the independent computing plane and a radio control plane and a data plane of the first base station and the second base station, so as to provide a real-time AI service or an extended (xF) service for the first terminal device, and also serve an AI service or a perception service of the first base station and the second base station. In this way, when the computing power resource of the first terminal device is insufficient, the first terminal device may request a computing power resource from the first base station and the core network device that provide the communication service; or when the computing power resource of the first base station is insufficient, the first base station may request a computing power resource from the second base station or the second terminal device, or request a computing power resource from the core network device, so that the first terminal device can support AI collaboration between devices such as the network device and the first terminal device in a wireless network when the computing power resource is sufficient.

It should be noted that the base station described in FIG. 2a may be understood as the first base station in FIG. 2b. The first base station and the second base station may include a central unit (CU) and a distributed unit (DU). The CU and the DU may be placed in different places. For example, the DU is placed remotely in a high-traffic area, and the CU is placed in a central equipment room. Alternatively, the CU and the DU may be placed in a same equipment room. Alternatively, the CU and the DU may be different components in a rack.

In addition, forms of the first base station and the second base station may be presented in different forms, for example, a macro base station, a micro base station (also referred to as a small station), a pico (pico base station), a relay station, and an access point. This is not limited in this embodiment of this application. In systems that use different radio access technologies, names of devices having a base station function may be different. For example, in an LTE system, the device is referred to as an evolved NodeB (eNB or eNodeB); and in a 3rd generation (3G) system, the device is referred to as a NodeB. It should be understood that, with evolution of future wireless communication technologies, for example, 6G and 7G, new base station names may also appear in the future. However, different names of base stations do not affect application of embodiments of this application to the base station.

The computing plane of the first base station and the computing plane of the second base station may be understood as being constructed based on a general-purpose CPU (for example, X86 or ARM), an AI chip, a GPU chip, an FPGA, or the like, and providing a computing-related task service for another logical function in the base station or a third party outside the base station. The task provisioning is to virtually cut computing resources based on different forms and granularities, including a cluster, a host, a virtual machine (VM), a virtual node (POD, which may include a plurality of containers), a container, and other fine-grained resources that can run a segment of logic code or functions (such as cloud native serverless).

For details about the first terminal device in FIG. 2a and FIG. 2b, refer to the user equipment shown in FIG. 1a. Details are not described herein again.

Figure 3:
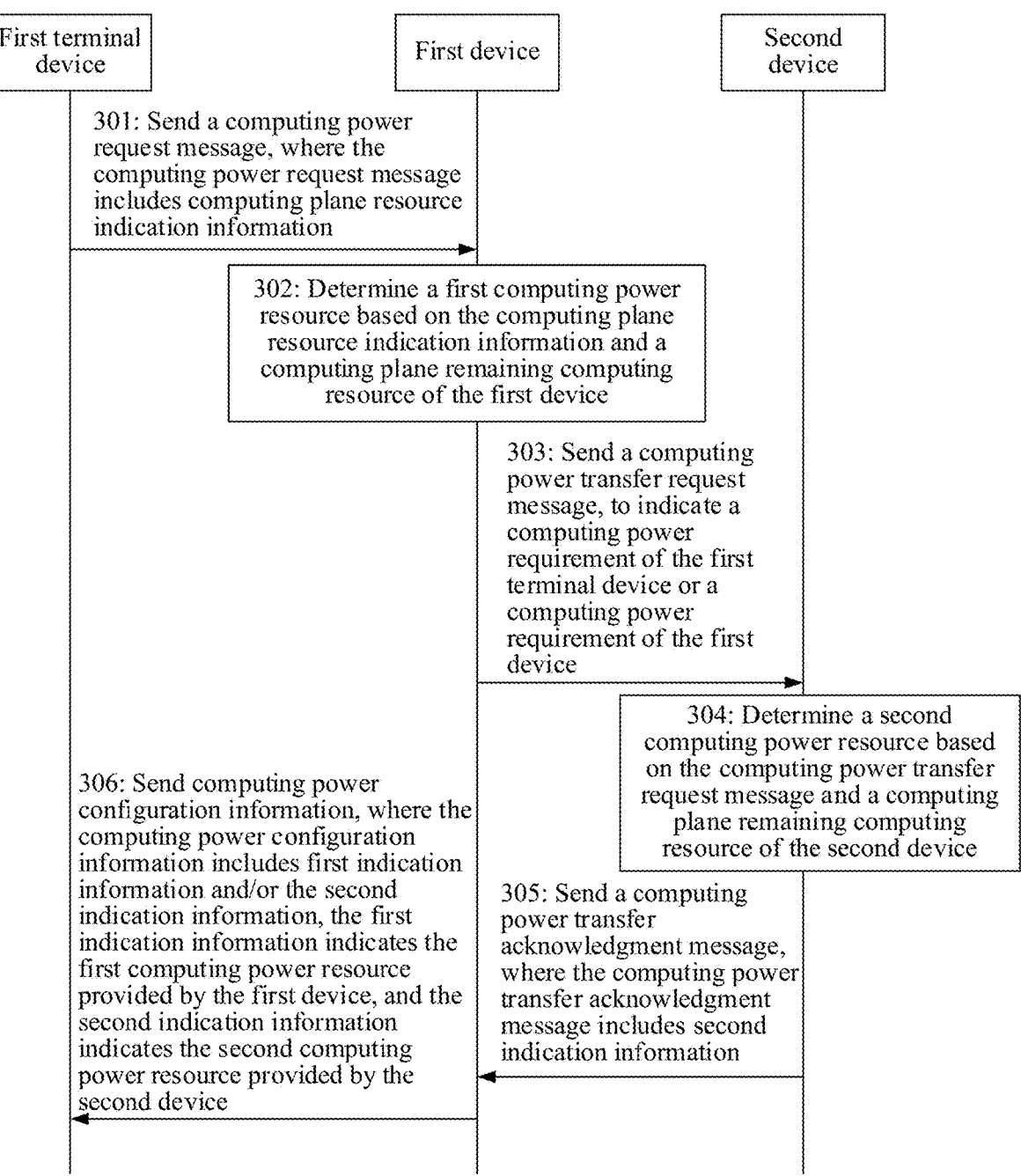
FIG. 3 is a schematic flowchart of a computing power resource scheduling method according to an embodiment of this application.

For ease of understanding, refer to FIG. 3. FIG. 3 is a schematic flowchart of a computing power resource scheduling method according to an embodiment of this application. It can be learned from FIG. 3 that the computing power resource scheduling method may include the following steps.

301: A first terminal device sends a computing power request message to a first device, where the computing power request message includes computing plane resource indication information.

In this example, when the first terminal device determines that the computing plane resource of the first terminal device is insufficient to support AI collaboration with another network device, the first terminal device may request a corresponding computing power resource from the first device by using the computing power request message. It should be noted that the computing power request message includes the computing plane resource indication information, and the computing plane resource indication information indicates a computing power requirement of the first terminal device. In this way, after receiving the computing power request message, the first device obtains the computing plane resource indication information by parsing the computing power request message, and then may learn of a quantity of computing power resources that need to be provided to the first terminal device.

Optionally, in some other examples, the described computing plane resource indication information includes one or more of a computing power size, an execution time, a computing power task type, a computing model, a computing algorithm, an execution result transmission trigger type, and a trigger type.

It should be noted that the computing power size may include but is not limited to a hash computing speed (hash/second) or a floating-point computing speed (floating-point operations per second (FLOPS)). This is not limited herein. The hash computing speed may include but is not limited to 1 kH/s, 1 MH/s, 1 GH/s, 1 TH/s, 1 PH/s, and 1 EH/s, and the floating-point computing speed includes but is not limited to 1 k FLOPS, 1M FLOPS, 1G FLOPS, 1T FLOPS, 1P FLOPS, and 1E FLOPS, which is not limited herein. It should be noted that, $k=10^3$, $M=10^6$, $G=10^9$, $T=10^{12}$, $P=10^{15}$, and $E=10^{18}$.

The execution time may include start time information and end time information.

The computing model may be understood as a protocol-predefined model, and model information or download address information of the model is indicated by using a model identifier, for example, a uniform resource locator (URL) or IP address information.

The computing algorithm may be supervised learning, unsupervised learning, a neural network, reinforcement learning, or the like. This is not limited herein. The supervised learning may include one or more of the following specific algorithms: a support vector machine (SVM), a decision tree, naive Bayesian classification, and k-nearest neighbor (KNN) algorithm. The unsupervised learning may include one or more of the following specific algorithms: principal component analysis (PCA), singular value decomposition (SVD), and k-means clustering. The reinforcement learning may include one or more of the following specific algorithms: a Q-learning algorithm, a state-action-reward-state-action (SARSA) algorithm, a deep Q network (DQN) algorithm, a deep deterministic policy gradient (DDPG) algorithm, and the like.

The execution result transmission trigger type may be periodically transmitting an execution result, for example, 1 ms, 2 ms, 5 ms, 10 ms, 20 ms, 50 ms, or 100 ms; or may be an execution result of an RRM event, for example, various RRM events such as A1 and A2, or the terminal changes from an RRC idle state or an RRC inactive state to an RRC connected state.

The trigger type may be periodic execution (for example, 1 ms, 2 ms, 5 ms, 10 ms, 20 ms, 50 ms, or 100 ms), or may be execution of an RRM event (for example, various RRM events such as A1 and A2, or the terminal changes from the RRC connected state to the RRC idle state or the RRC inactive state).

302: The first device determines a first computing power resource based on the computing plane resource indication information and a computing plane remaining computing resource of the first device.

In this example, the computing plane remaining computing resource of the first device indicates a remaining computing plane resource of the first device. After receiving the computing power request message sent by the first terminal device, the first device may also determine, based on the computing plane remaining computing resource of the first device, whether to respond to the computing power request message of the first terminal device. When the first device determines to respond to the computing power request message, the first device may determine the first computing power resource based on the computing plane resource indication information and the computing plane remaining computing resource.

It should be noted that in some embodiments, the first device may also refuse to respond to the computing power request message of the first terminal device. In this way, the first terminal device needs to obtain indication information of a corresponding computing power resource from another device such as a network device or a base station, and then obtain support of the corresponding computing power resource from the another device such as the network device or the base station based on the indication information of the corresponding computing power resource.

303: The first device sends a computing power transfer request message to a second device, to indicate a computing power requirement of the first terminal device or a computing power requirement of the first device.

In this example, when the first device determines to respond to the computing power request message of the first terminal device, the first device may provide indication information (referred to as first indication information subsequently) of the determined first computing power resource to the first terminal device, or may send a computing power transfer request message to the second device, to obtain indication information (referred to as second indication information subsequently) of a second computing power resource from another second device. The first indication information may indicate the first computing power resource provided by the first device, and the second indication information may indicate the second computing power resource provided by the second device.

Specifically, in some other embodiments, when the computing plane remaining computing resource of the first device is less than the computing plane resource requested in the computing plane resource indication information, the first device sends the computing power transfer request message to the second device, to indicate the second device to determine the second computing power resource.

That is, it is understood that, if the computing plane remaining computing resource of the first device is insufficient to meet the computing plane resource required by the first terminal device, the first device may send the computing power transfer request message to another second device having the computing plane resource, so as to indicate the second device to provide the corresponding second indication information to the first terminal device after determining the corresponding second computing power resource.

Alternatively, in some other examples, in a process in which the first terminal device performs cell handover, the first device may also send a computing power transfer request message to the second device, to indicate the second device to determine a corresponding second computing power resource. In this case, the second device needs to directly provide the corresponding second indication information for the first terminal device.

304: The second device determines a second computing power resource based on the computing power transfer request message and a computing plane remaining computing resource of the second device.

In this example, after receiving the computing power transfer request message sent by the first device, the second device may determine the second computing power resource based on the computing power transfer request message and the computing plane remaining computing resource of the second device.

305: The second device sends a computing power transfer acknowledgment message, where the computing power transfer acknowledgment message includes the second indication information.

In this example, after determining the second computing power resource, the second device can include the second indication information corresponding to the second computing power resource in the computing power transfer acknowledgment message, and send the computing power transfer acknowledgment message to the first terminal device or the first device. The second indication information indicates the second computing power resource provided by the second device, that is, indicating a specific computing power resource status of the second computing power resource that can be provided by the second device.

306: The first device sends computing power configuration information to the first terminal device, where the computing power configuration information includes the first indication information and/or the second indication information, the first indication information indicates the first computing power resource provided by the first device, and the second indication information indicates the second computing power resource provided by the second device.

In this example, after the first device determines the first computing power resource and the second device provides the corresponding second indication information, the computing power configuration information may be sent to the first terminal device, that is, the computing power configuration information includes the first indication information and/or the second indication information. In this way, the first terminal device may obtain the first indication information and/or the second indication information, to obtain support of the first computing power resource in the first device based on the first indication information, and/or obtain support of the second computing power resource in the second device based on the second indication information.

It should be noted that the first indication information may indicate the first computing power resource provided by the first device, that is, indicating a specific computing power resource status of the first computing power resource that can be provided by the first device. The first computing power resource may be a computing resource that needs to be used in a data processing process, and includes but is not limited to a software resource and/or a hardware resource, for example, a CPU, a GPU, and an I/O, or may be a neural network algorithm model resource used for image processing, or may be a memory, or the like. This is not limited herein. The second computing power resource may also be understood with reference to content of the first computing power resource. Details are not described herein again.

It should be understood that the first device may be a first base station, or may be a core network device, and the second device may be a second base station, or may be a core network device. The first terminal device may request a computing power resource from different provisioning devices, for example, the first base station, the core network device, and the second base station. For details, refer to subsequent embodiments described in FIG. 4a to FIG. 8. Details are not described herein again.

In this embodiment of this application, when the computing power resource of the first terminal device is insufficient to support AI collaboration with another network device, the first terminal device may send the computing power request message to the first device, so that the first device determines the first computing power resource based on the computing plane resource indication information in the computing power request message and the computing plane remaining computing resource of the first device. Then, the first device sends corresponding computing power configuration information to the first terminal device, where the computing power configuration information includes the first indication information and/or the second indication information. In this way, the first terminal device may obtain support of the first computing power resource in the first device based on the first indication information, and/or obtain support of the second computing power resource in the second device based on the second indication information, to support the AI collaboration with the another network device. In addition, by using the shared computing power resource, a network benefit is improved, and energy consumption of the first terminal device and a configuration requirement of the computing power resource are reduced, so that a reuse degree of the computing power resource can be effectively improved, thereby achieving an effect of energy saving and emission reduction.

Figure 4A:
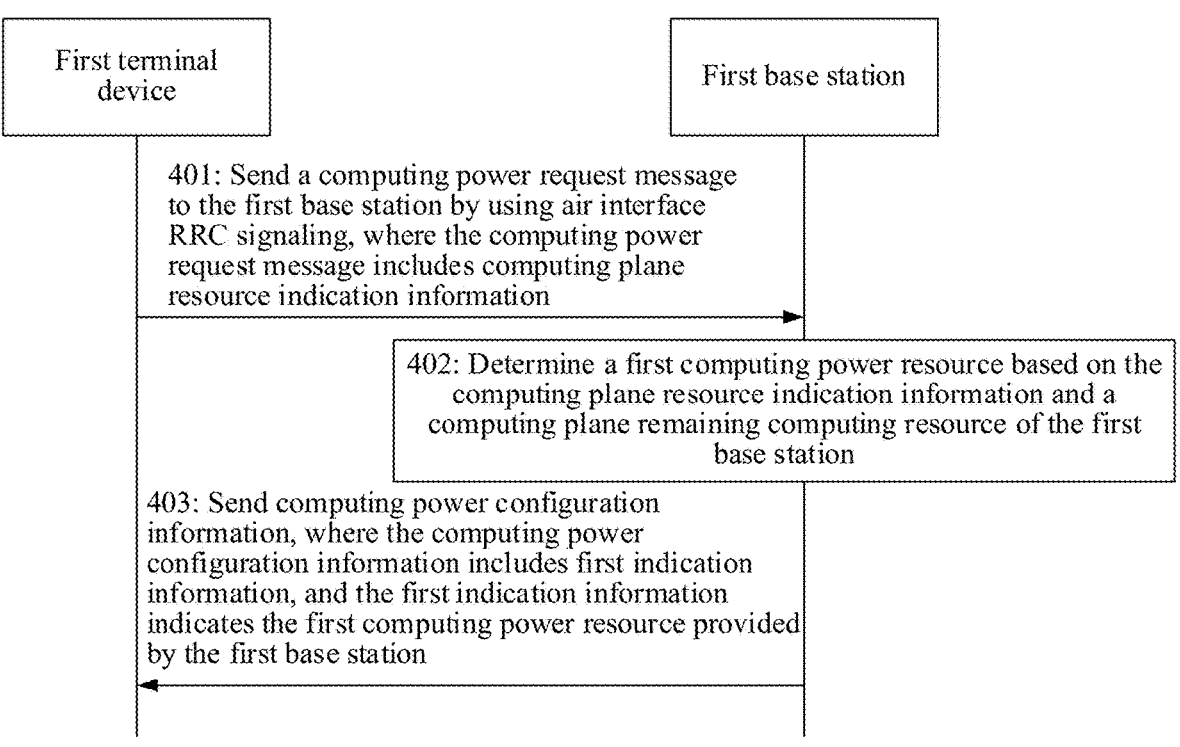
FIG. 4a is a schematic flowchart of another computing power resource scheduling method according to an embodiment of this application.

To further understand the computing power resource scheduling method provided in this embodiment of this application, the following uses an example in which the first device includes the first base station for description. For details, refer to FIG. 4a. FIG. 4a is a flowchart of another computing power resource scheduling method according to an embodiment of this application. As shown in FIG. 4a, the computing power resource scheduling method may include the following steps.

401: A first terminal device sends a computing power request message to a first base station by using air interface RRC signaling, where the computing power request message includes computing plane resource indication information.

In this example, when the first terminal device determines that the computing plane resource of the first terminal device is insufficient to support AI collaboration with another network device, the first terminal device may send the computing power request message to the first base station by using the air interface RRC signaling, to request the first base station to provide a corresponding computing power resource. It should be noted that the computing power request message includes the computing plane resource indication information, and the computing plane resource indication information indicates a computing power requirement of the first terminal device. In this way, after receiving the computing power request message, the first base station obtains the computing plane resource indication information by parsing the computing power request message, and then may learn of a quantity of computing power resources that need to be provided to the first terminal device.

Specifically, the first terminal device may notify, in a radio resource control (RRC) connection establishment request, the first base station of a reason for establishing an RRC connection, that is, adding a computing request access reason value to an Establishment Cause information element, that is, carry the foregoing computing plane resource indication information. Alternatively, the first terminal device may define an uplink computing power request message in an uplink-dedicated control channel-message type (UL-DCCH-Message Type), and the uplink computing power request message carries the computing plane resource indication information.

In addition, the radio may be understood as an interaction interface between the first terminal device and the base station.

It should be noted that the foregoing computing plane resource indication information may be specifically understood with reference to content described in step 301 in FIG. 3. Details are not described herein again.

402: The first base station determines a first computing power resource based on the computing plane resource indication information and a computing plane remaining computing resource of the first base station.

In this example, the computing plane remaining computing resource of the first base station indicates a remaining computing plane resource of the first base station. After receiving the computing power request message sent by the first terminal device, the first base station may also determine, based on the computing plane remaining computing resource of the first base station, whether to respond to the computing power request message of the first terminal device. When the first base station determines to respond to the computing power request message, the first base station may determine the first computing power resource based on the computing plane resource indication information and the computing plane remaining computing resource.

It should be noted that in some embodiments, the first base station may also refuse to respond to the computing power request message of the first terminal device. In this way, the first terminal device needs to obtain the computing power resource from another provisioning device such as a network device or a base station.

403: The first base station sends computing power configuration information to the first terminal device, where the computing power configuration information includes first indication information, and the first indication information indicates the first computing power resource provided by the first base station.

In this example, when the first base station determines to respond to the computing power request message of the first terminal device, if the computing plane remaining computing resource of the first base station is greater than or equal to the computing power resource requested in the computing plane resource indication information, the first base station may directly determine the first computing power resource from the computing plane remaining computing resource of the first base station. In this way, after determining the first computing power resource, the first base station may include the first indication information in the computing power configuration information, and then send the computing power configuration information to the first terminal device. In this way, the first terminal device may obtain the computing power configuration information, and further obtain the first indication information included in the computing power configuration information.

Specifically, the first base station may send a computing power establishment message to the first terminal device by using air interface RRC signaling, where the computing power establishment message may include the foregoing computing power configuration information. The computing power establishment message may further include computing radio bearer (CRB) configuration information, where the CRB configuration information is used by the first terminal device to determine a CRB resource, and the CRB resource is used for exchanging data input and output, computing model data, or computing algorithm data between the first terminal device and the first base station during computing power offloading.

Optionally, the data or the model or the algorithm carried in the CRB is mapped to a protocol data unit (PDU) of a computing class in a packet data convergence protocol (PDCP) layer.

Optionally, the CRB is a subset of a user data radio bearer (DRB) or a signaling radio bearer (SRB).

Figure 4B:
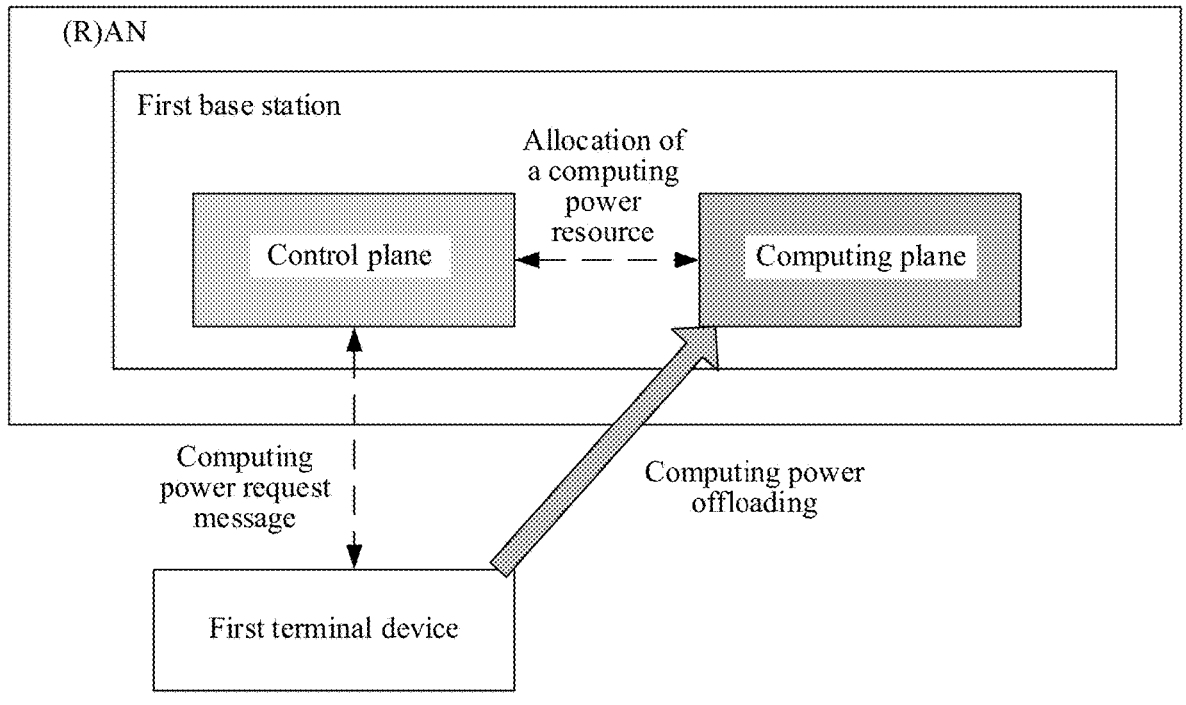
FIG. 4b is a schematic diagram of computing power transfer according to an embodiment of this application.

For details, refer to FIG. 4b. FIG. 4b is a schematic diagram of computing power transfer according to an embodiment of this application. It can be learned from FIG. 4b that, the first terminal device sends the computing power request message to the control plane of the first base station, and completes allocation and confirmation of the first computing power resource on the control plane of the first base station and the computing plane of the first base station, so that the control plane of the first base station sends the first indication information to the first terminal device, to complete the request for the computing power resource. Finally, the first terminal device offloads the computing power to the computing plane of the first base station. By using the CRB, the first terminal device and the first base station may exchange data input and output, computing model data, or computing algorithm data during computing power offloading.

It should be noted that the foregoing first computing power resource may be understood with reference to content described in step 306 in FIG. 3. Details are not described herein again.

Figure 5A:
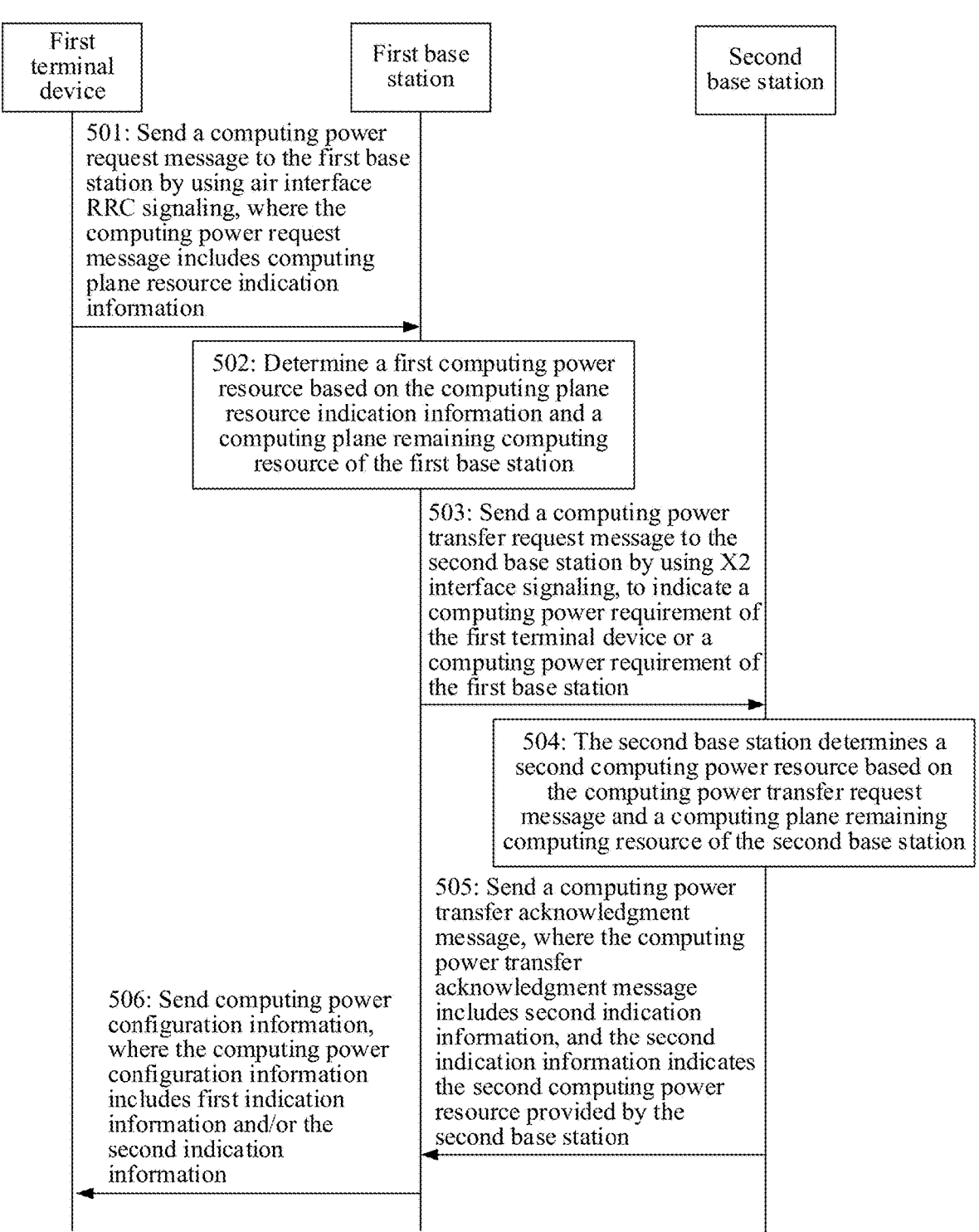
FIG. 5a is a schematic flowchart of another computing power resource scheduling method according to an embodiment of this application.

To further understand the computing power resource scheduling method provided in embodiments of this application, the following uses an example in which the first device includes a first base station and the second device includes a second base station for description. For details, refer to FIG. 5a. FIG. 5a is a flowchart of another computing power resource scheduling method according to an embodiment of this application. As shown in FIG. 5a, the computing power resource scheduling method may include the following steps.

501: A first terminal device sends a computing power request message to a first base station by using air interface RRC signaling, where the computing power request message includes computing plane resource indication information.

It should be noted that step 501 in this embodiment may be specifically understood with reference to content described in step 401 in FIG. 4a. Details are not described herein again.

502: The first base station determines a first computing power resource based on the computing plane resource indication information and a computing plane remaining computing resource.

It should be noted that, steps 501 and 502 in this embodiment may be specifically understood with reference to content described in steps 401 and 402 in FIG. 4a. Details are not described herein again.

503: The first base station sends a computing power transfer request message to a second base station by using X2 interface signaling, to indicate a computing power requirement of the first terminal device or a computing power requirement of the first base station.

In this example, when the first base station determines that the computing plane remaining computing resource of the first base station cannot meet the computing power resource requested by the first terminal device, or the first terminal device needs to be handed over to a cell covered by the second base station, the first base station may send the computing power transfer request message to the second base station, to indicate the second base station to provide the second computing power resource, so as to meet the request of the first terminal device. Specifically, the first base station may send the computing power transfer request message to the second base station by using X2 interface signaling.

It should be noted that the computing power transfer request message may also be understood with reference to the computing power request message described in step 301 in FIG. 3. Details are not described herein again.

504: The second base station determines a second computing power resource based on the computing power transfer request message and a computing plane remaining computing resource of the second base station.

In this example, after receiving the computing power transfer request message of the first base station, the second base station may determine the second computing power resource based on the computing plane remaining computing resource of the second base station and the computing power transfer request message.

That is, it is understood that, if the computing plane remaining computing resource of the first base station is insufficient to meet the computing power resource required by the first terminal device, the first base station may send a computing power transfer request message to another second base station having a computing plane resource, to indicate the second base station to provide a corresponding second computing power resource for the first terminal device.

505: The second base station sends a computing power transfer acknowledgment message to the first base station, where the computing power transfer acknowledgment message includes second indication information, and the second indication information indicates the second computing power resource provided by the second base station.

In this example, the first base station is a base station that directly serves the first terminal device, therefore after determining the second computing power resource, the second base station may send the second indication information to the first base station in a manner of a computing power transfer acknowledgment message. Specifically, the second base station may also send a computing power transfer acknowledgment message to the first base station by using X2 interface signaling, so as to send the second indication information included in the computing power transfer acknowledgment message to the first base station. In addition, the X2 interface may be understood as an interaction interface between base stations.

It should be noted that in some other examples, in a scenario in which the first terminal device is handed over from a cell covered by the first base station to a cell covered by the second base station, the second base station may directly send the second indication information to the first terminal device. Details are not described herein.

In addition, the computing power transfer acknowledgment message may further include computing radio bearer CRB configuration information, where the computing radio bearer CRB configuration information is used by the first terminal device to determine a CRB resource, and the describe CRB resource is used for exchanging data input and output, computing model data, or computing algorithm data between the first terminal device and the first base station during computing power offloading. The CRB may be understood with reference to the CRB described in step 403 in FIG. 4a, and details are not described herein again.

506: The first base station sends computing power configuration information to the first terminal device, where the computing power configuration information includes first indication information and/or the second indication information.

Specifically, the first base station may also send the computing power configuration information to the first terminal device by using air interface RRC signaling.

In this example, when the first base station determines that the computing plane remaining computing resource is insufficient to meet the computing power resource requested by the first terminal device, the first base station sends the computing power transfer request message to the second base station by using X2 interface signaling, and the second base station determines the corresponding second computing power resource. In this way, after obtaining the second indication information sent by the second base station, the first base station may send the computing power configuration information to the first terminal device with reference to the first indication information, that is, the computing power configuration information includes the first indication information and/or the second indication information. In this way, the first terminal device may obtain support of the first computing power resource in the first base station based on the first indication information, and/or obtain support of the second computing power resource in the second base station based on the second indication information, to support AI collaboration with another network device.

Figure 5B:
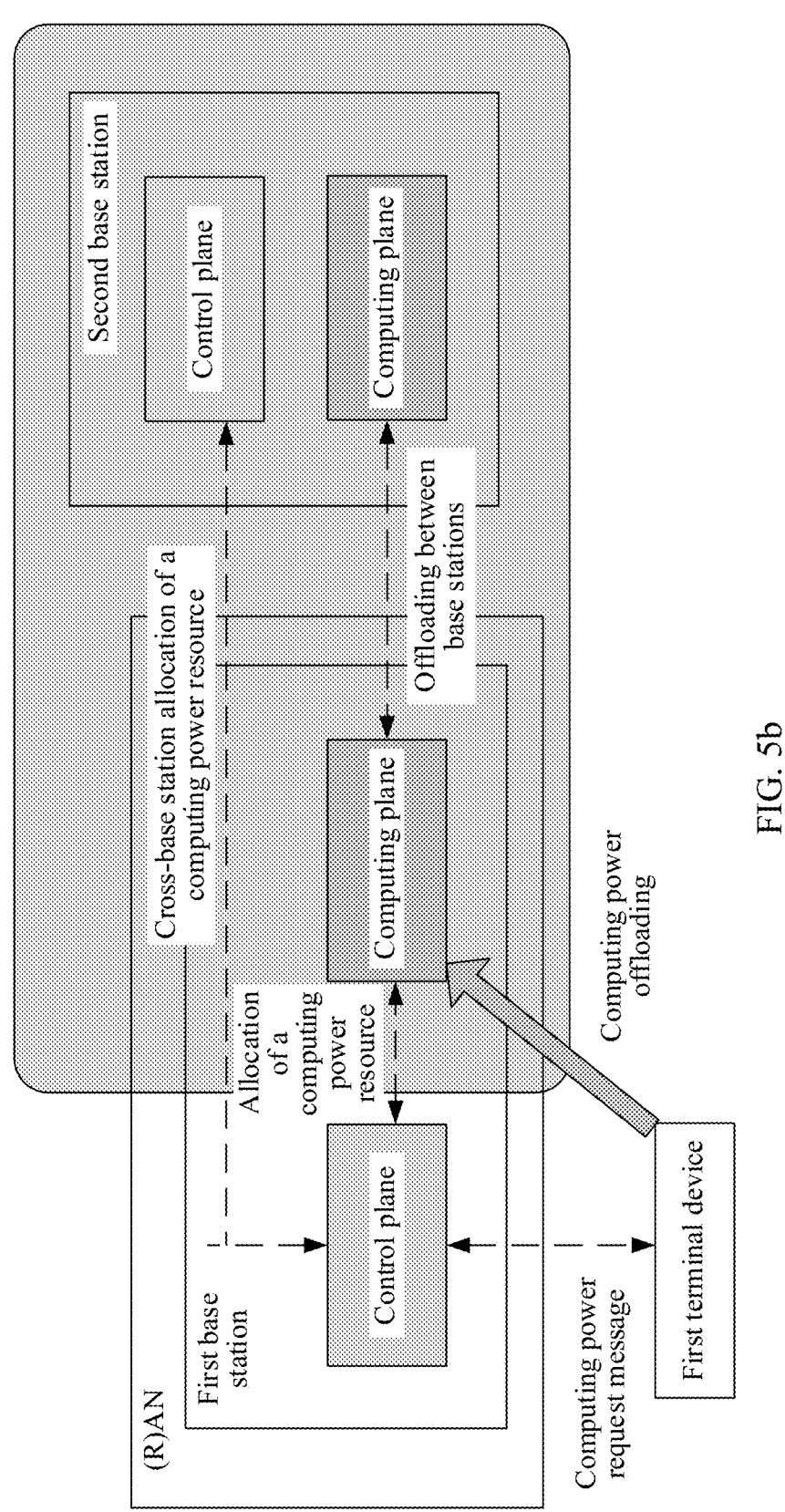
FIG. 5b is a schematic diagram of another computing power transfer according to an embodiment of this application.

For details, refer to FIG. 5b. FIG. 5b is a schematic diagram of computing power transfer according to an embodiment of this application. It can be learned from FIG. 5b that, the first terminal device sends the computing power request message to the control plane of the first base station, and completes allocation and confirmation of the first computing power resource on the control plane of the first base station and the computing plane of the first base station. In addition, allocation and confirmation of the cross-base station second computing power resource are completed on the control plane of the first base station and the control plane of the second base station, so that the control plane of the first base station sends the first indication information and the second indication information to the first terminal device, to complete the request for the computing power resource.

Finally, the first terminal device offloads the computing power to the computing plane of the first base station. By using the CRB, the first terminal device and the first base station may exchange data input and output, computing model data, or computing algorithm data during computing power offloading.

If the computing power resource of the first base station is insufficient to support the computing power request of the first terminal device, the first base station also offloads a part of the computing power to the computing plane of the second base station, and exchanges data input and output, computing model data, or computing algorithm data during computing power offloading by using the X2 interface.

If the first terminal device needs to offload the computing power from the first base station to the second base station due to mobility of the first terminal device, the first terminal device offloads the computing power to the computing plane of the second base station. By using the CRB, the first terminal device and the second base station may exchange data input and output, computing model data, or computing algorithm data during computing power offloading.

Figure 6A:
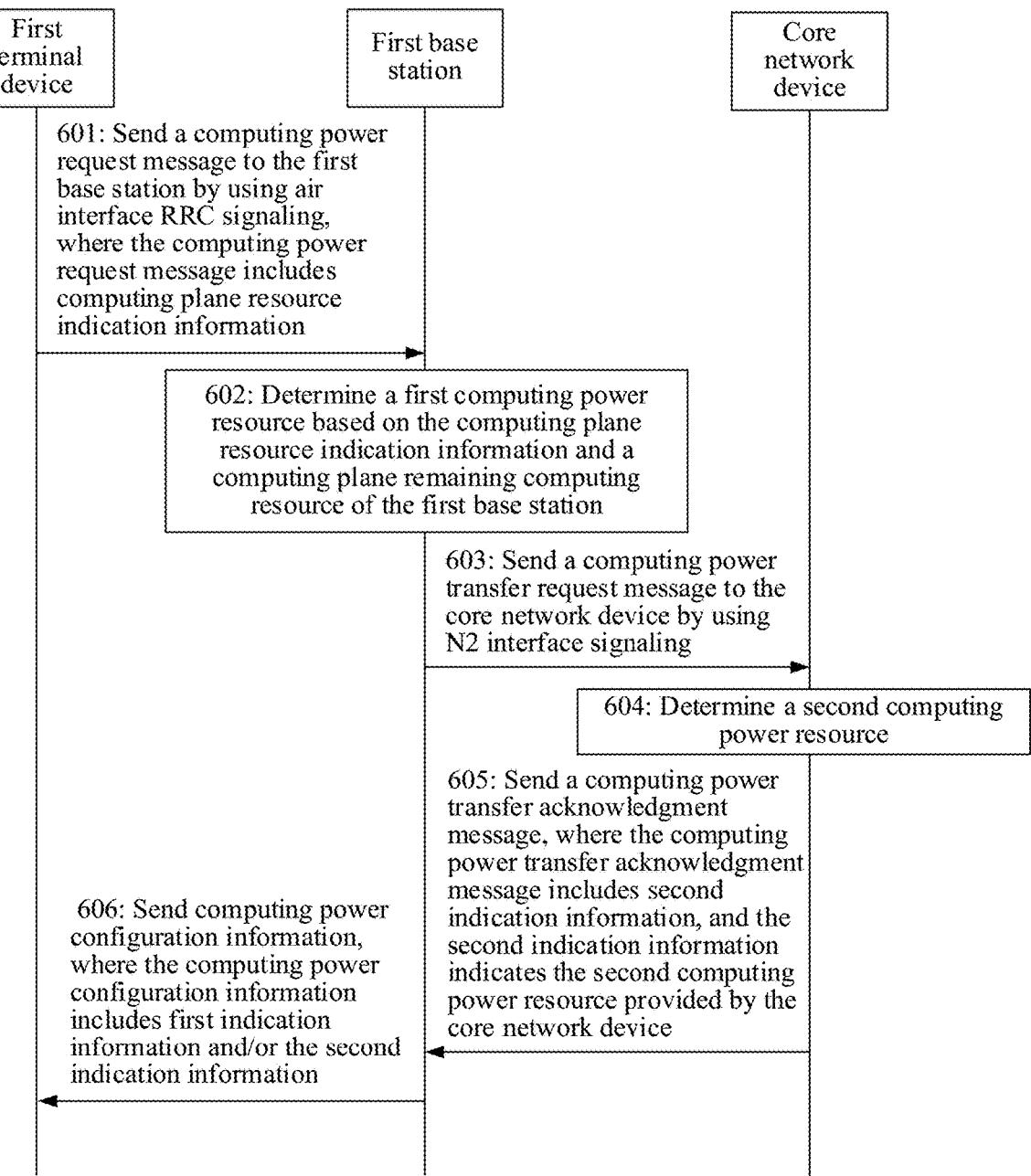
FIG. 6a is a schematic flowchart of another computing power resource scheduling method according to an embodiment of this application.

To further understand the computing power resource scheduling method provided in embodiments of this application, the following uses an example in which the first terminal device includes the first terminal device, the first device includes the first base station, and the second device includes the core network device for description. For details, refer to FIG. 6a. FIG. 6a is a flowchart of another computing power resource scheduling method according to an embodiment of this application. As shown in FIG. 6a, the computing power resource scheduling method may include the following steps.

601: A first terminal device sends a computing power request message to a first base station by using air interface RRC signaling, where the computing power request message includes computing plane resource indication information.

602: The first base station determines a first computing power resource based on the computing plane resource indication information and a computing plane remaining computing resource of the first base station.

It should be noted that, steps 601 and 602 in this embodiment may be specifically understood with reference to content described in steps 401 and 402 in FIG. 4a. Details are not described herein again.

603: The first base station sends a computing power transfer request message to a core network device by using N2 interface signaling.

In this example, when the first base station determines that the computing plane remaining computing resource of the first base station cannot meet the computing power resource requested by the first terminal device, the first base station may obtain the computing power resource from the core network device, to meet the request of the first terminal device. Specifically, when the computing plane remaining computing resource is less than the computing plane resource requested in the computing plane resource indication information, the first base station may send the computing power transfer request message to the core network device by using the N2 interface signaling. In addition, the N2 interface may be understood as an interaction interface between the base station and an AMF network element.

It should be noted that the computing power transfer request message may also be understood with reference to the computing power request message described in step 301 in FIG. 3. Details are not described herein again.

604: The core network device determines a second computing power resource.

In this example, after receiving the computing power transfer request message of the first base station, the core network device may determine the second computing power resource based on the computing plane remaining computing resource of the core network device and the computing power transfer request message.

605: The core network device sends a computing power transfer acknowledgment message to the first base station, where the computing power transfer acknowledgment message includes second indication information, and the second indication information indicates the second computing power resource provided by the core network device.

In this example, the first base station is a base station that directly serves the first terminal device, therefore after determining the second computing power resource, the core network device may send a computing power transfer acknowledgment message to the first base station by using N2 interface signaling. The computing power transfer acknowledgment message includes the second indication information. In addition, the computing power transfer acknowledgment message may be understood with reference to step 505 in FIG. 5a. Details are not described herein again.

606: The first base station sends computing power configuration information to the first terminal device, where the computing power configuration information includes first indication information and/or the second indication information.

It should be noted that step 606 in this embodiment may be specifically understood with reference to content described in step 506 in FIG. 5a. Details are not described herein again.

In this example, when the first base station determines that the computing plane remaining computing resource is insufficient to meet the computing power resource requested by the first terminal device, the first base station sends the computing power transfer request message to the core network device by using N2 interface signaling, and the core network device determines the corresponding second computing power resource. In this way, after obtaining the second indication information sent by the core network device, the first base station may send the computing power configuration information to the first terminal device with reference to the first indication information, that is, the computing power configuration information includes the first indication information and/or the second indication information. In this way, the first terminal device may obtain support of the first computing power resource from the first device based on the first indication information, and/or obtain support of the second computing power resource from the second device based on the second indication information, to support the AI collaboration with the another network device.

Figure 6B:
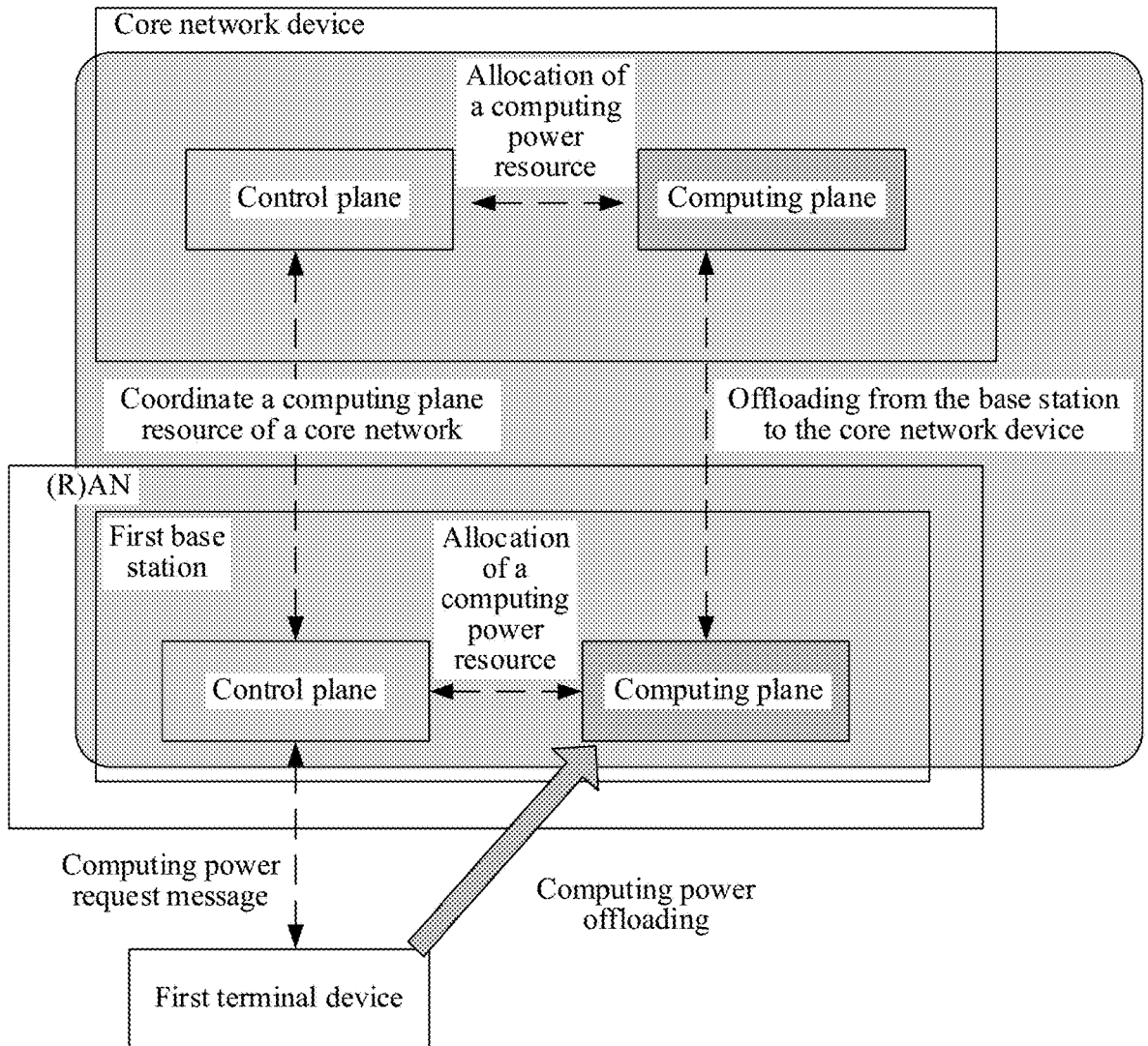
FIG. 6b is a schematic diagram of computing power transfer according to an embodiment of this application.

For details, refer to FIG. 6b. FIG. 6b is a schematic diagram of computing power transfer according to an embodiment of this application. It can be learned from FIG. 6b that, the first terminal device sends the computing power request message to the control plane of the first base station, so as to complete allocation and confirmation of the first computing power resource on the control plane of the first base station and the computing plane of the first base station. In addition, allocation and confirmation of the second computing power resource are completed on the computing plane of the core network device and the control plane of the core network device. In this way, the control plane of the first base station sends the first indication information and the second indication information to the first terminal device, to complete the request for the computing power resource.

Finally, the first terminal device offloads the computing power to the computing plane of the first base station. By using the CRB, the first terminal device and the first base station may exchange data input and output, computing model data, or computing algorithm data during computing power offloading.

If the computing power resource of the first base station is insufficient to support the computing power request of the first terminal device, the first base station also offloads a part of the computing power to the computing plane of the core network device, and exchanges data input and output, computing model data, or computing algorithm data during computing power offloading by using the N2 interface.

Figure 7A:
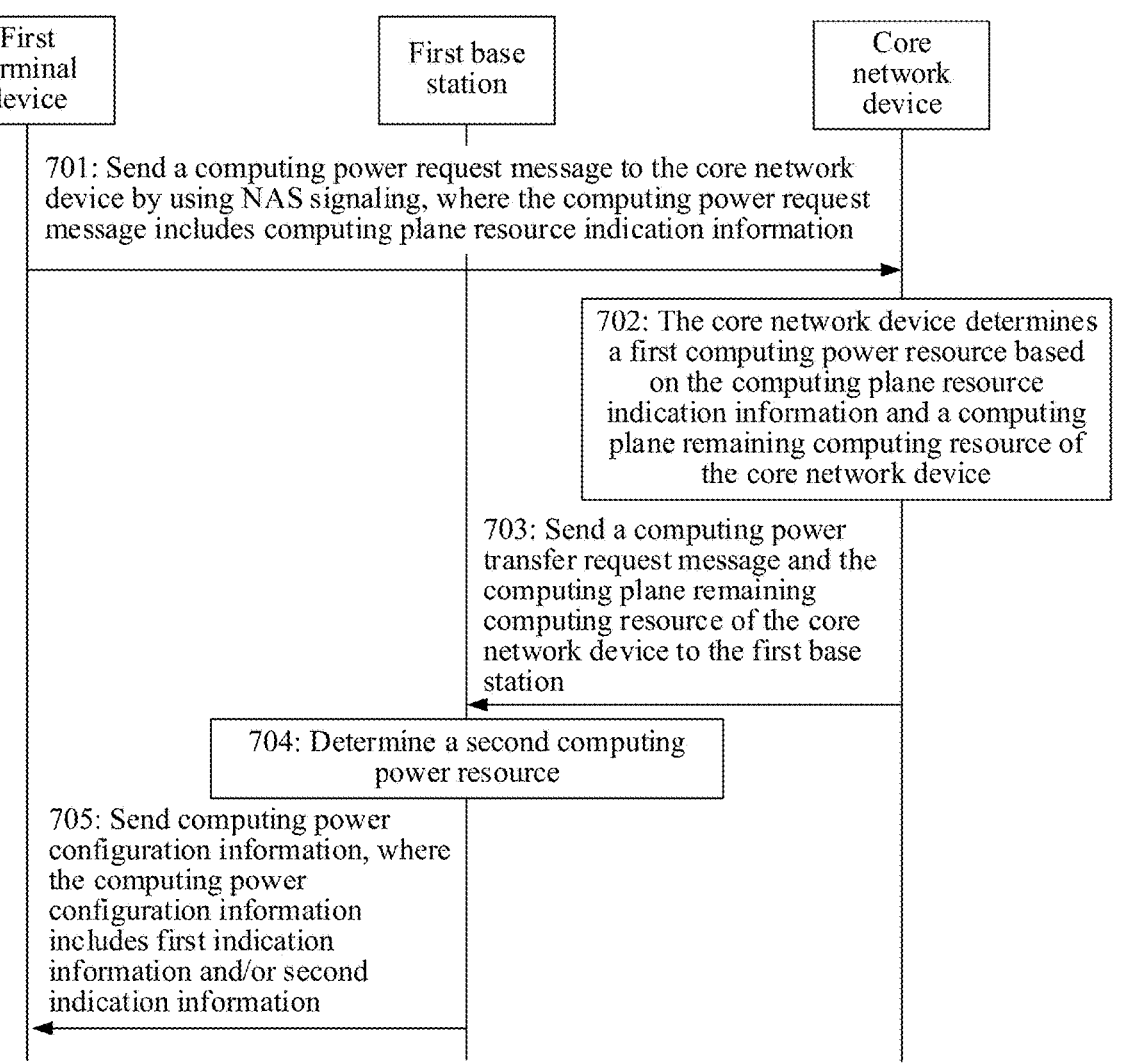
FIG. 7a is a schematic flowchart of another computing power resource scheduling method according to an embodiment of this application.

To further understand the computing power resource scheduling method provided in embodiments of this application, the following uses an example in which the first device includes a core network device and the second device includes a first base station for description. For details, refer to FIG. 7a. FIG. 7a is a flowchart of another computing power resource scheduling method according to an embodiment of this application. As shown in FIG. 7a, the computing power resource scheduling method may include the following steps.

701: A first terminal device sends a computing power request message to a core network device by using NAS signaling, where the computing power request message includes computing plane resource indication information.

It should be noted that the NAS interface may be understood as an interaction interface between the first terminal device and an AMF network element.

702: The core network device determines a first computing power resource based on the computing plane resource indication information and a computing plane remaining computing resource of the core network device.

It should be noted that in an actual application, after obtaining the computing plane resource of a first base station and/or a second base station, the core network device may determine a first task with reference to the computing plane resource indication information and the computing plane remaining computing resource of the core network device. In addition, the foregoing computing plane resource indication information may be understood with reference to content described in step 301 in FIG. 3. Details are not described herein again.

703: When the computing plane remaining computing resource of the core network device is less than the computing plane resource requested in the computing plane resource indication information, the core network device sends a computing power transfer request message and the computing plane remaining computing resource of the core network device to a first base station.

In this example, when the core network device determines that the computing plane remaining computing resource of the core network device cannot meet the computing power resource requested by the first terminal device, the core network device may request the first base station to provide a second computing power resource, so as to meet the request of the first terminal device. Specifically, when the computing plane remaining computing resource is less than the computing plane resource requested in the computing plane resource indication information, the core network device sends the computing power transfer request message to the first base station, and sends the computing plane remaining computing resource of the core network device to the first base station.

It should be noted that the computing power transfer request message may also be understood with reference to the computing power request message described in step 301 in FIG. 3. Details are not described herein again.

704: The first base station determines a second computing power resource.

In this example, after receiving the computing power transfer request message of the core network device, the first base station may determine the second computing power resource based on the computing plane remaining computing resource of the first base station and the computing power transfer request message. In other words, it is understood that, if the computing plane remaining computing resource of the core network device is insufficient to meet the computing plane resource required by the first terminal device, the core network device may send a computing power transfer request message to another first base station having a computing plane resource, so that the first base station can provide corresponding indication information of the computing power transfer resource to the first terminal device.

It should be noted that in some embodiments, if the computing plane remaining computing resource of the first base station is also insufficient to meet the computing plane resource required by the first terminal device, the first base station may further request a corresponding second computing power resource from the second base station. For details, refer to step 502 to step 505 in FIG. 5a. The first base station is a base station that directly provides a service for the first terminal device, and the second base station may be understood as a base station that does not directly provide a service for the first terminal device.

705: The first base station sends computing power configuration information to the first terminal device, where the computing power configuration information includes first indication information and/or second indication information.

In this example, when the core network device determines that the computing plane remaining computing resource is insufficient to meet the computing power resource requested by the first terminal device, the core network device sends the computing power transfer request message to the first base station, so that the first base station determines the corresponding second computing power resource. In this way, after determining the second computing power resource, the first base station may send the computing power configuration information to the first terminal device, that is, the computing power configuration information includes the first indication information and/or the second indication information. In this way, the first terminal device may obtain support of the first computing power resource from the first device based on the first indication information, and/or obtain support of the second computing power resource from the second device based on the second indication information, to support the AI collaboration with the another network device.

Figure 7B:
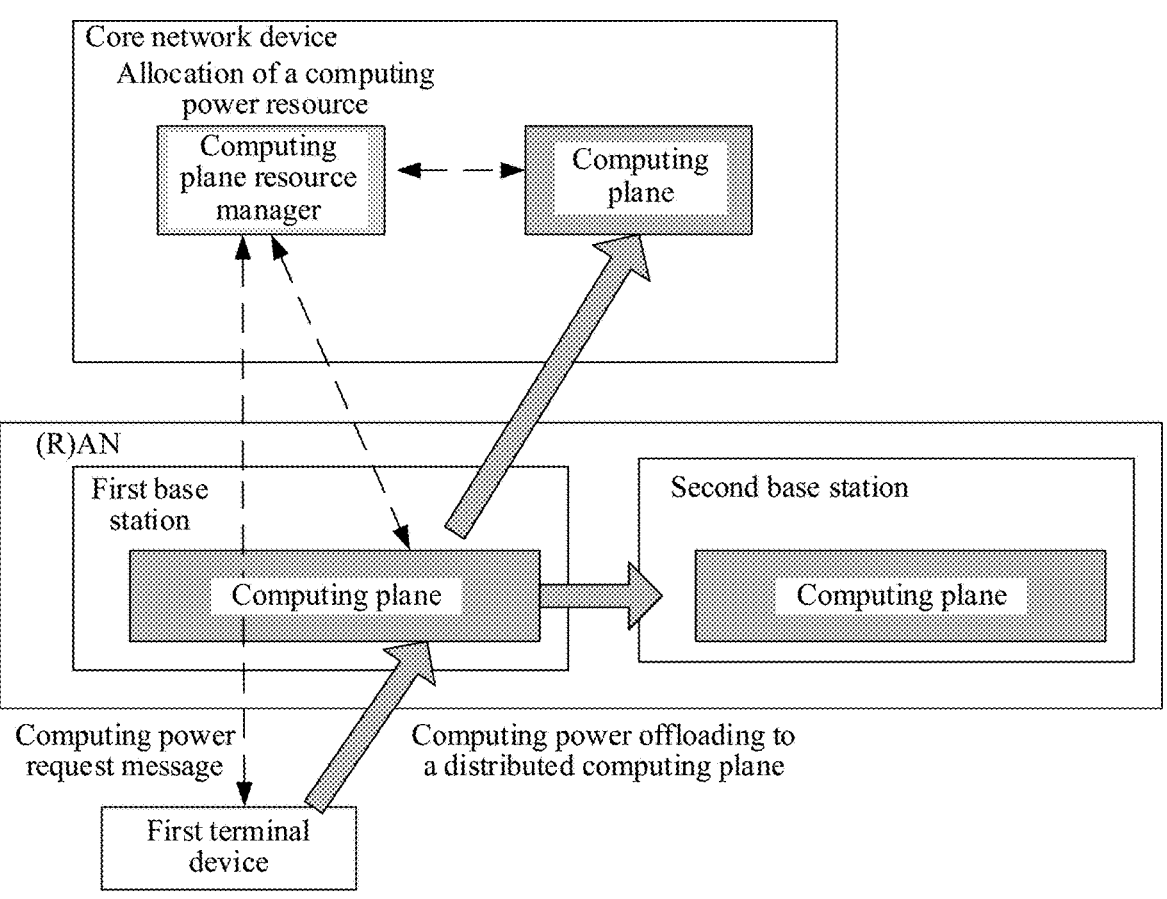
FIG. 7b is a schematic diagram of another computing power transfer according to an embodiment of this application.

For details, refer to FIG. 7b. FIG. 7b is a schematic diagram of computing power transfer according to an embodiment of this application. It can be learned from FIG. 7b that, the first terminal device sends the computing power request message to a computing plane resource manager of the core network device, so as to complete allocation and confirmation of the first computing power resource in the computing plane resource manager of the core network device and the computing plane of the core network. In addition, allocation and confirmation of the second computing power resource are completed in the computing plane resource manager of the core network device, the computing plane of the first base station, and the computing plane of the second base station. In this way, the first base station sends the first indication information and the second indication information to the first terminal device, to complete the request for the computing power resource.

Finally, the first terminal device offloads the computing power to the computing plane of the first base station. By using the CRB, the first terminal device and the first base station may exchange data input and output, computing model data, or computing algorithm data during computing power offloading.

If the computing power resource of the first base station is insufficient to support the computing power request of the first terminal device, the first base station also offloads a part of the computing power to the computing plane of the core network device, and exchanges data input and output, computing model data, or computing algorithm data during computing power offloading by using the N2 interface; and/or the first base station may also offload a part of the computing power to the computing plane of the second base station, and exchange data input and output, computing model data, or computing algorithm data during computing power offloading by using an X2 interface.

Figure 8:
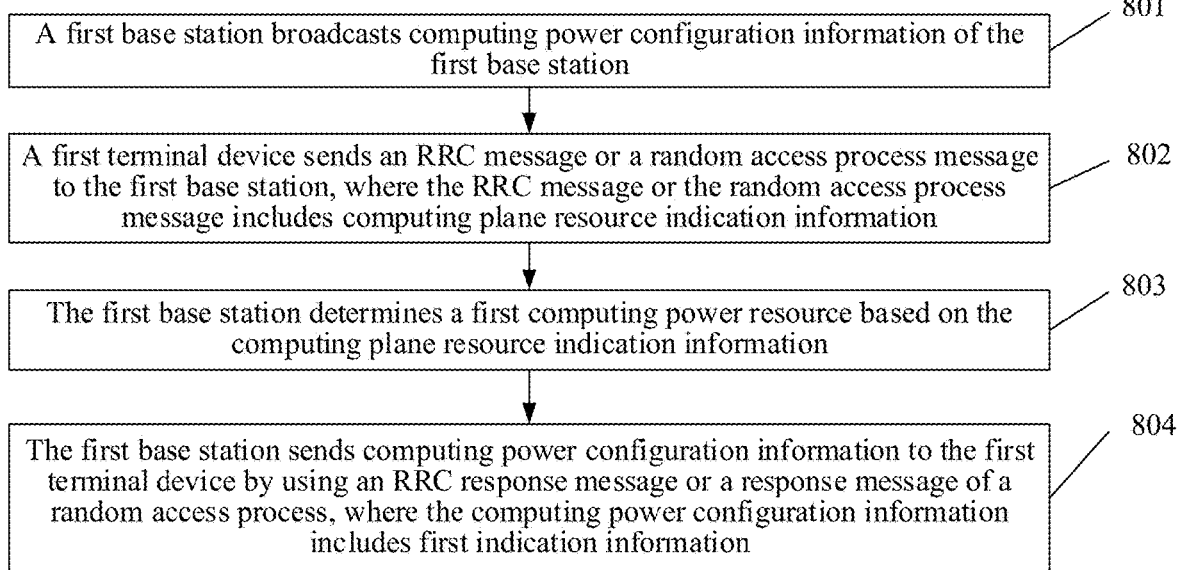
FIG. 8 is a schematic flowchart of another computing power resource scheduling method according to an embodiment of this application.

To further understand the computing power resource scheduling method provided in this embodiment of this application, the following uses an example in which the first device includes the first base station for description. For details, refer to FIG. 8. FIG. 8 is a flowchart of another computing power resource scheduling method according to an embodiment of this application. As shown in FIG. 8, the computing power resource scheduling method may include the following steps.

801: A first base station broadcasts computing power configuration information of the first base station.

802: A first terminal device sends an RRC message or a random access process message to the first base station, where the RRC message or the random access process message includes computing plane resource indication information.

In this example, when the first terminal device determines that a computing plane resource of the first terminal device is insufficient to support AI collaboration with another network device, the first terminal device may send an RRC message or a random access process message to the first base station after the first base station has broadcast the computing power resource of the first base station in a broadcast manner, to request the first base station to provide a corresponding computing power resource. It should be noted that the RRC message or the random access process message includes the computing plane resource indication information. In this way, after receiving the RRC message or the random access process message, the first base station obtains the computing plane resource indication information by parsing the RRC message or the random access process message, and then may learn of a quantity of computing power resources that need to be provided to the first terminal device.

803: The first base station determines a first computing power resource based on the computing plane resource indication information.

804: The first base station sends computing power configuration information to the first terminal device by using an RRC response message or a response message of a random access process, where the computing power configuration information includes first indication information.

In this example, after determining the first computing power resource, the first base station may send the computing power configuration information to the first terminal device. In this way, the first terminal device may obtain the computing power configuration information, and further obtain the first indication information included in the computing power configuration information.

Optionally, in some other embodiments, an update period of the foregoing computing power configuration information is the same as a transmission period of a system broadcast message, and the computing power configuration information collects statistics on an average computing power in a system broadcast message period, a supported computing model or algorithm, and the like.

Optionally, in some other embodiments, the RRC response message or the response message of the random access process transmits instant computing power statistics information of the computing plane of the first base station.

Optionally, in some other embodiments, the computing power configuration information broadcast by the first base station may further include computing capability information of the core network device and/or computing capability information of the second base station. The first base station may obtain the computing capability information of the second base station by using an interface between base stations, for example, an X2/Xn interface. The first base station may also obtain the computing capability information of the core network device by using an interface between the first base station and the core network device. This is not specifically limited herein.

Figure 9A:
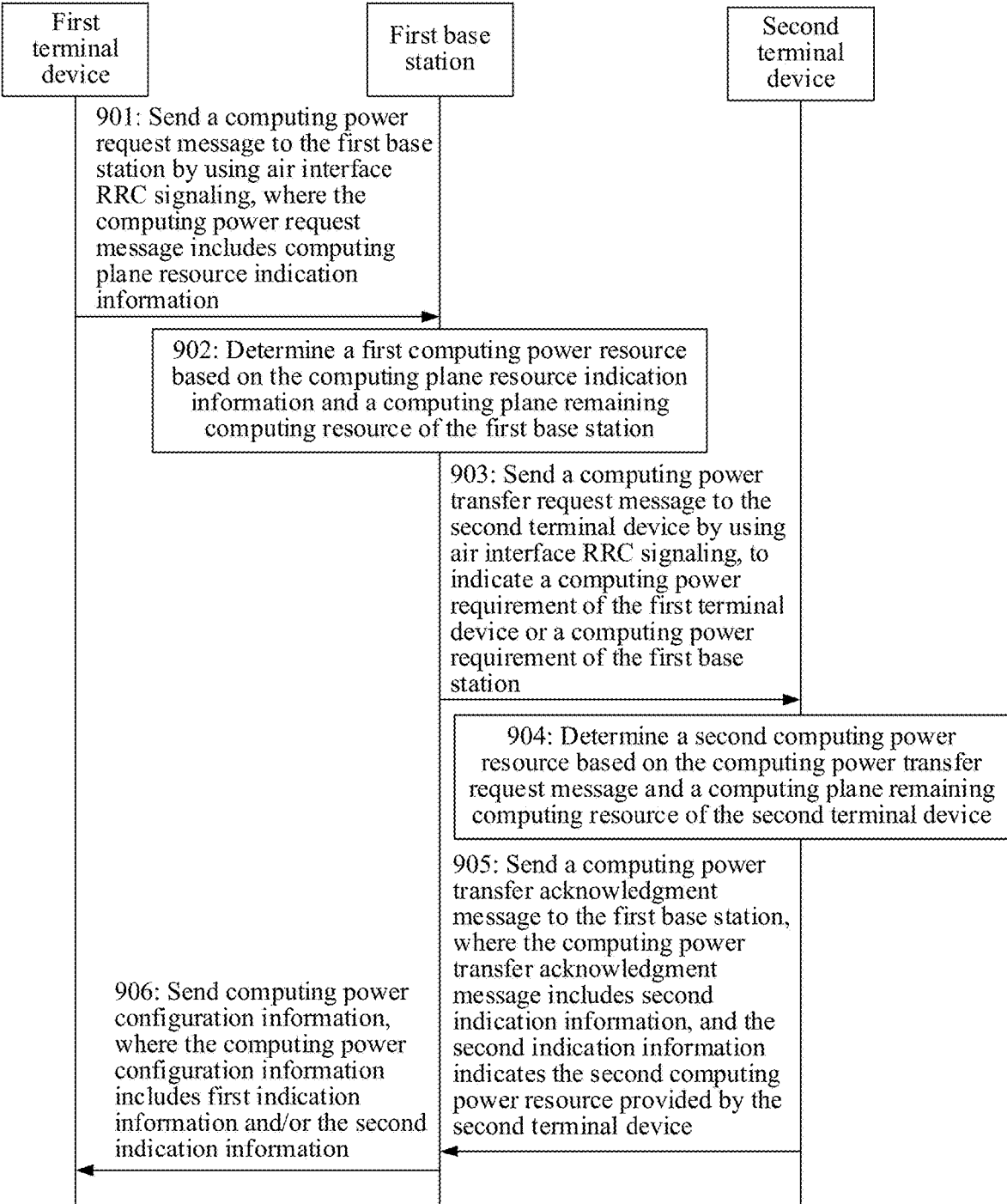
FIG. 9a is a schematic flowchart of another computing power resource scheduling method according to an embodiment of this application.

To further understand the computing power resource scheduling method provided in embodiments of this application, the following uses an example in which the first device includes the first base station and the second device includes the second terminal device for description. For details, refer to FIG. 9a. FIG. 9a is a flowchart of another computing power resource scheduling method according to an embodiment of this application. As shown in FIG. 9a, the computing power resource scheduling method may include the following steps.

901: A first terminal device sends a computing power request message to a first base station by using air interface RRC signaling, where the computing power request message includes computing plane resource indication information.

902: The first base station determines a first computing power resource based on the computing plane resource indication information and a computing plane remaining computing resource.

It should be noted that, steps 901 and 902 in this embodiment may be specifically understood with reference to content described in steps 501 and 502 in FIG. 5*a*. Details are not described herein again.

903: The first base station sends a computing power transfer request message to a second terminal device, to indicate a computing power requirement of the first terminal device or a computing power requirement of the first base station.

In this example, when the first base station determines that the computing plane remaining computing resource of the first base station cannot meet the computing power resource requested by the first terminal device, the first base station may send the computing power transfer request message to the second terminal device, to indicate the second terminal device to provide the second computing power resource, so as to meet the request of the first terminal device. Specifically, the first base station may send the computing power transfer request message to the second terminal device by using air interface RRC signaling.

It should be noted that the computing power transfer request message may also be understood with reference to the computing power request message described in step 301 in FIG. 3. Details are not described herein again.

In addition, the computing power transfer request message may further include computing radio bearer CRB configuration information, where the computing radio bearer CRB configuration information is used by the second terminal device to determine a CRB resource, and the described CRB resource is used for exchanging data input and output, computing model data, or computing algorithm data between the second terminal device and the first base station during computing power offloading. The CRB may be understood with reference to the CRB described in step 403 in FIG. 4*a*, and details are not described herein again.

Optionally, the computing power transfer request message may further include computing radio bearer CRB configuration information, where the computing radio bearer CRB configuration information is used by the second terminal device to determine a CRB resource, and the CRB resource is used for exchanging data input and output, computing model data, or computing algorithm data between the second terminal device and the first terminal device during computing power offloading.

904: The second terminal device determines a second computing power resource based on the computing power transfer request message and a computing plane remaining computing resource of the second terminal device.

In this example, after receiving the computing power transfer request message of the first base station, the second terminal device may determine the second computing power resource based on the computing plane remaining computing resource of the second terminal device and the computing power transfer request message.

That is, it is understood that, if the computing plane remaining computing resource of the first base station is insufficient to meet the computing power resource required by the first terminal device, the first base station may send a computing power transfer request message to another second terminal device having a computing plane resource, to indicate that the second terminal device can provide a corresponding second computing power resource to the first terminal device.

905: The second terminal device sends a computing power transfer acknowledgment message to the first base station, where the computing power transfer acknowledgment message includes second indication information, and the second indication information indicates the second computing power resource provided by the second terminal device.

In this example, the first base station is a base station that directly serves the first terminal device, therefore after determining the second computing power resource, the second terminal device may send the second indication information to the first base station in a manner of a computing power transfer acknowledgment message. Specifically, the second terminal device may also send a computing power transfer acknowledgment message to the first base station by using air interface RRC signaling, so as to send the second indication information included in the computing power transfer acknowledgment message to the first base station.

906: The first base station sends computing power configuration information to the first terminal device, where the computing power configuration information includes first indication information and/or second indication information.

Specifically, the first base station may also send the computing power configuration information to the first terminal device by using air interface RRC signaling.

In this example, when the first base station determines that the computing plane remaining computing resource is insufficient to meet the computing power resource requested by the first terminal device, the first base station sends the computing power transfer request message to the second terminal device by using air interface RRC signaling, so that the second terminal device determines the corresponding second computing power resource. In this way, after obtaining the second indication information sent by the second terminal device, the first base station may send the computing power configuration information to the first terminal device with reference to the first indication information, that is, the computing power configuration information includes the first indication information and/or the second indication information. In this way, the first terminal device may obtain support of the first computing power resource in the first base station based on the first indication information, and/or obtain support of the second computing power resource in the second terminal device based on the second indication information, to support AI collaboration with another network device.

Figure 9B:
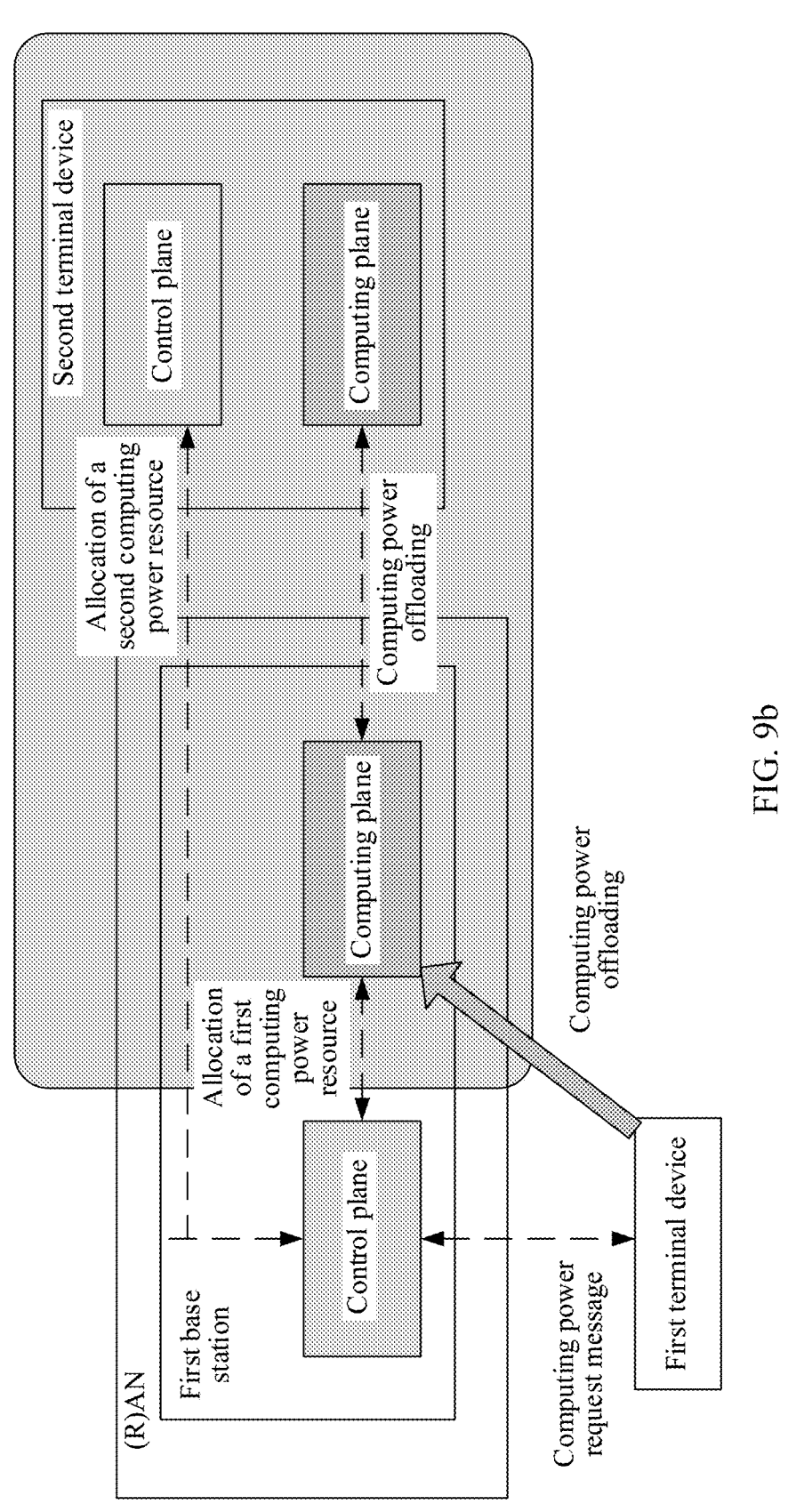
FIG. 9b is a schematic diagram of another computing power transfer according to an embodiment of this application.

For details, refer to FIG. 9*b*. FIG. 9*b* is a schematic diagram of computing power transfer according to an embodiment of this application. It can be learned from FIG. 9*b* that, the first terminal device sends the computing power request message to the control plane of the first base station, and completes allocation and confirmation of the cross-base station second computing power resource on the control plane of the first base station and the control plane of the second terminal device, so that the control plane of the first base station sends the first indication information and the second indication information to the first terminal device, to complete the request for the computing power resource.

Finally, the first terminal device offloads the computing power to the computing plane of the first base station. By using the CRB, the first terminal device and the first base station may exchange data input and output, computing model data, or computing algorithm data during computing power offloading.

If the computing power resource of the first base station is insufficient to support the computing power request of the first terminal device, the first base station also offloads a part of the computing power to the computing plane of the second terminal device, and exchanges data input and output, computing model data, or computing algorithm data during computing power offloading by using air interface or CRB.

If the first terminal device and the second terminal device are adjacent terminals, the first terminal device and the second terminal device may further directly exchange data input and output, computing model data, or computing algorithm data during computing power offloading by using a vehicle to everything (V2X) or a device-to-device communication (D2D) interface.

In this embodiment of this application, when the computing power resource of the first terminal device is insufficient to support AI collaboration with another network device, the first terminal device may send the computing power request message to the first device, so that the first device determines the first computing power resource based on the computing plane resource indication information in the computing power request message and the computing plane remaining computing resource of the first device. Then, the first device sends corresponding computing power configuration information to the first terminal device, where the computing power configuration information includes the first indication information and/or the second indication information. In this way, the first terminal device may obtain support of the first computing power resource from the first device based on the first indication information, and/or obtain support of the second computing power resource from the second device based on the second indication information, to support the AI collaboration with the another network device.

The foregoing mainly describes the solutions provided in embodiments of this application from the perspective of the methods. It may be understood that, to implement the foregoing functions, the first terminal device and the first device include corresponding hardware structures and/or software modules for performing the functions. A person skilled in the art should be easily aware that, in combination with the functions described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

From a perspective of functional units, in this application, the first terminal device and the first device may be divided into functional units based on the foregoing method embodiments. For example, various functional units may correspond to various functions, or two or more functions may be integrated into one functional unit. The integrated functional unit may be implemented in a form of hardware, or may be implemented in a form of a software functional unit.

Figure 10:
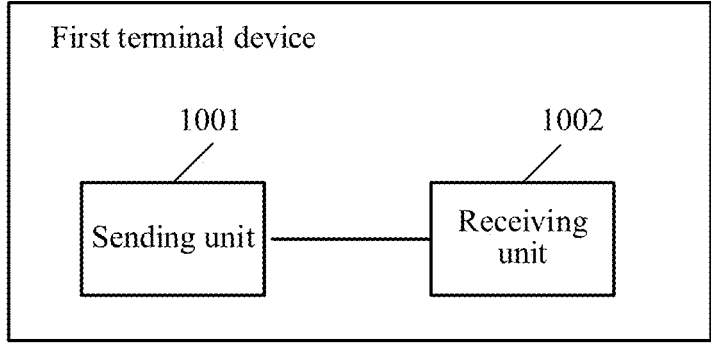
FIG. 10 is a schematic diagram of a structure of a first terminal device according to an embodiment of this application.

For example, when the functional units are divided in an integrated manner, FIG. 10 is a schematic structural diagram of a first terminal device according to an embodiment of this application. The first terminal device may include:

a sending unit 1001, configured to send a computing power request message to a first device, where the computing power request message includes computing plane resource indication information, and the computing plane resource indication information indicates a computing power requirement of the first terminal device; and a receiving unit 1002, configured to receive computing power configuration information sent by the first device, where the computing power configuration information includes first indication information and/or second indication information, the first indication information indicates a first computing power resource provided by the first device, the second indication information indicates a second computing power resource provided by a second device, and the first device is different from the second device.

Optionally, in some examples, the first device is a first base station; and the sending unit 1001 is configured to send the computing power request message to the first device by using air interface RRC signaling.

Optionally, in some embodiments, the first device is a first base station; and the receiving unit 1002 is configured to receive the computing power configuration information sent by the first device by using the air interface RRC signaling.

Optionally, in some examples, the first device is a core network device; and the sending unit 1001 is configured to send the computing power request message to the first device by using NAS signaling.

Optionally, in some embodiments, the first device is a core network device; and the receiving unit 1002 is configured to receive the computing power configuration information sent by the first device by using the NAS signaling.

Optionally, in some examples, the computing plane resource indication information includes one or more of a computing power size, an execution time, a computing power task type, a computing model, a computing algorithm, an execution result transmission trigger type, and a trigger type.

Figure 11:
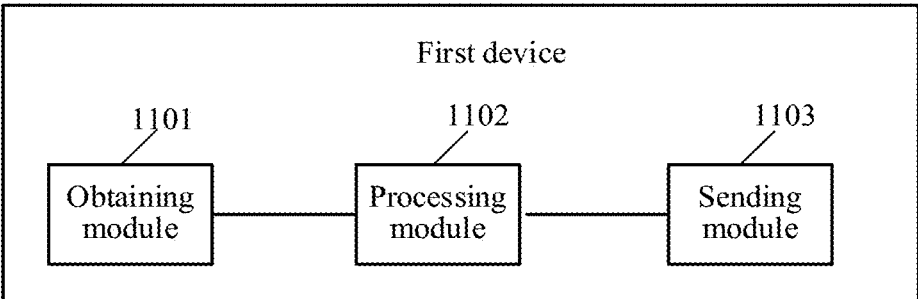
FIG. 11 is a schematic diagram of a structure of a first device according to an embodiment of this application.

The foregoing mainly describes a structure of the first terminal device. The following describes the foregoing first device from a perspective of a functional unit. For example, when the functional units are divided in an integrated manner, FIG. 11 is a schematic structural diagram of a first device according to an embodiment of this application. The first device may include:

an obtaining module 1101, configured to receive a computing power request message sent by a first terminal device, where the computing power request message includes computing plane resource indication information, and the computing plane resource indication information indicates a computing power requirement of the first terminal device;

a processing module 1102, configured to determine a first computing power resource based on the computing plane resource indication information and a computing plane remaining computing resource of the first device; and a sending module 1103, configured to send computing power configuration information to the first terminal device, where the computing power configuration information includes first indication information and/or second indication information, the first indication information indicates the first computing power resource provided by the first device, the second indication information indicates a second computing power resource provided by a second device, and the first device is different from the second device.

Optionally, in some examples, the sending module 1103 is configured to send a computing power transfer request message to the second device, to indicate the computing power requirement of the first terminal device or a computing power requirement of the first device; and the obtaining module 1101 is configured to receive a computing power transfer acknowledgment message sent by the second device, where the computing power transfer acknowledgment message includes the second indication information.

Optionally, in some examples, the first device includes a first base station, and the second device includes a second base station; and the sending module 1103 is configured to send the computing power transfer request message to the second device by using X2 interface signaling.

Optionally, in some embodiments, the first device includes a first base station, and the second device includes a second base station; and the obtaining module 1101 is configured to receive the computing power transfer acknowledgment message sent by the second device by using the X2 interface signaling.

Optionally, in some examples, the first device includes a first base station, and the second device includes a core network device; and the sending module 1103 is configured to send the computing power transfer request message to the second device by using N2 interface signaling.

Optionally, in some embodiments, the first device includes a first base station, and the second device includes a core network device; and the obtaining module 1101 is configured to receive the computing power transfer acknowledgment message sent by the second device by using the N2 interface signaling.

Optionally, in some examples, the first device is a first base station; and the sending module 1103 is configured to receive the computing power request message sent by the first terminal device by using air interface RRC signaling.

Optionally, in some embodiments, the first device is the first base station; and the sending module 1103 is configured to send the computing power configuration information to the first terminal device by using the air interface RRC signaling.

Optionally, in some examples, the first device is a core network device, and the second device includes a first base station and/or a second base station; and the sending module 1103 is configured to receive the computing power request message sent by the first terminal device by using NAS signaling.

Optionally, in some embodiments, the first device is a core network device, and the second device includes a first base station; and the sending module 1103 is configured to send the computing power configuration information to the first terminal device by using the NAS signaling.

Optionally, in some embodiments, the first device includes a first base station, and the second device includes a second terminal device; and the sending module 1103 is configured to send the computing power transfer request message to the second device by using the air interface RRC signaling.

Optionally, in some embodiments, the first device includes a first base station, and the second device includes a second terminal device; and the obtaining module 1101 is configured to receive the computing power transfer acknowledgment message sent by the second device by using the air interface RRC signaling.

Optionally, in some examples, the computing plane resource indication information includes one or more of a computing power size, an execution time, a computing power task type, a computing model, a computing algorithm, an execution result transmission trigger type, and a trigger type.

Figure 12:
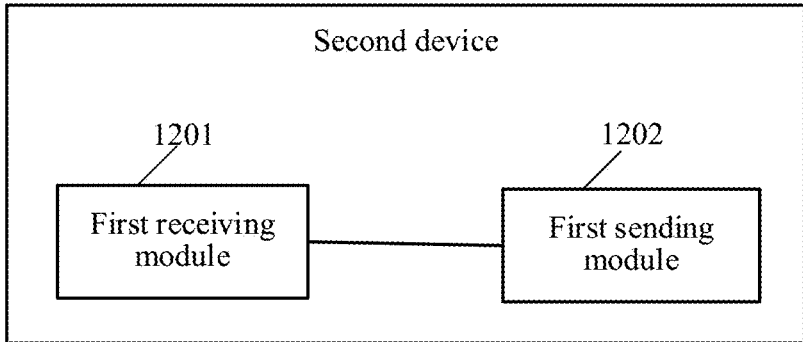
FIG. 12 is a schematic diagram of a structure of a second device according to an embodiment of this application.

The foregoing mainly describes structures of the first terminal device and the first device. The following describes the foregoing second device from a perspective of a functional unit. For example, when the functional units are divided in an integrated manner, FIG. 12 is a schematic structural diagram of a second device according to an embodiment of this application. The second device may include:

a first receiving module 1201, configured to receive a computing power transfer request message sent by a first device; a first processing module, configured to determine a second computing power resource based on the computing power transfer request message and a computing plane remaining computing resource of the second device; and a first sending module 1202, configured to send a computing power transfer acknowledgment message to the first device, where the computing power transfer acknowledgment message includes second indication information, and the second indication information indicates the second computing power resource provided by the second device.

Optionally, in some embodiments, the first receiving module 1201 is configured to receive the computing power transfer request message sent by the first device by using X2 interface signaling.

Optionally, in some embodiments, the first device includes a first base station, and the second device includes a second base station; and the first sending module 1202 is configured to send the computing power transfer acknowledgment message to the first device by using the X2 interface signaling.

Optionally, in some embodiments, the first receiving module 1201 is configured to receive the computing power transfer request message sent by the first device by using N2 interface signaling.

Optionally, in some embodiments, the first device includes a first base station, and the second device includes a core network device; and the first sending module 1202 is configured to send the computing power transfer acknowledgment message to the first device by using the N2 interface signaling.

Optionally, in some embodiments, the first device includes a first base station, and the second device includes a second terminal device; and the first receiving module 1201 is configured to receive the computing power transfer request message sent by the first device by using air interface RRC signaling.

Optionally, in some embodiments, the first device includes a first base station, and the second device includes a second terminal device; and the first sending module 1202 is configured to send the computing power transfer acknowledgment message to the first device by using the air interface RRC signaling.

It should be noted that, content such as information exchange between the modules/units of the apparatus and the execution processes thereof is based on the same idea as the method embodiments of this application, and produces the same technical effects as the method embodiments of this application. For specific content, refer to the foregoing descriptions in the method embodiments of this application. Details are not described herein again.

The foregoing describes the first terminal device, the first device, and the second device in embodiments of this application from a perspective of a modular functional entity. From a perspective of physical devices, the first terminal device, the first device, and the second device may be implemented by one physical device, or may be jointly implemented by a plurality of physical devices, or may be a logical function unit in one physical device. This is not specifically limited in this embodiment of this application.

Figure 13:
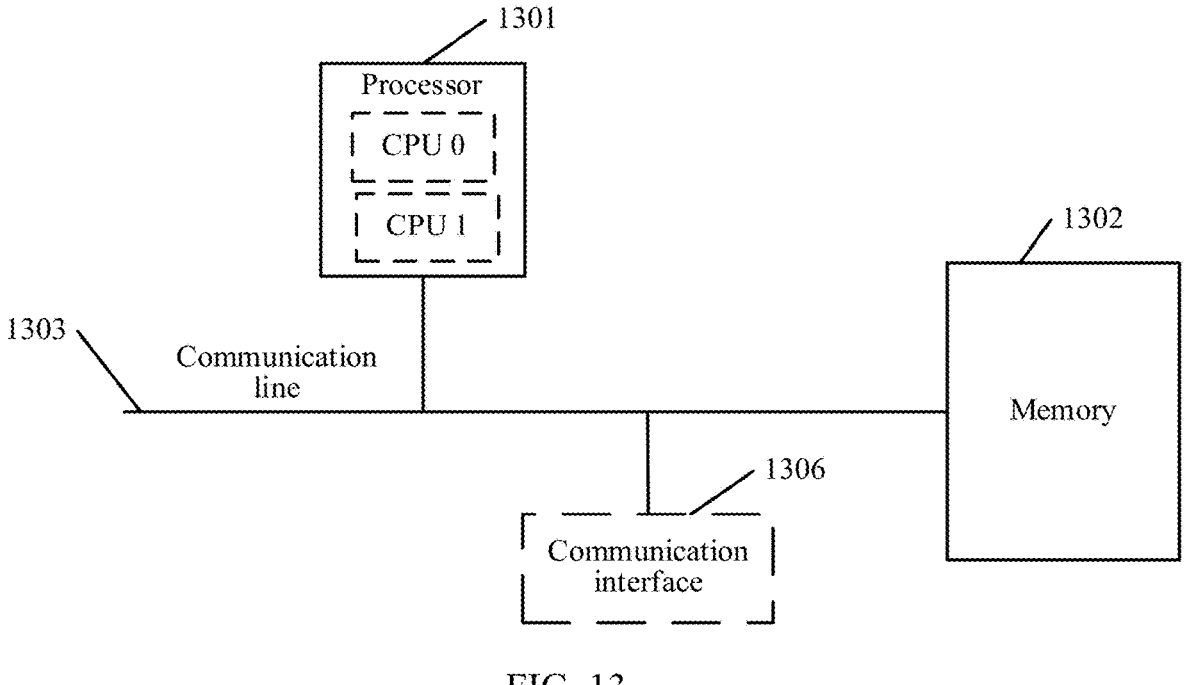
FIG. 13 is a schematic diagram of a hardware structure of a communication device according to an embodiment of this application.

For example, the first terminal device, the first device, and the second device may be implemented by the communication device in FIG. 13. FIG. 13 is a schematic diagram of a hardware structure of a communication device according to an embodiment of this application. The communication device includes at least one processor 1301, a communication line 1303, a memory 1302, and at least one communication interface 1306.

The processor 1301 may be a general-purpose central processing unit (CPU), a microprocessor, an application-specific integrated circuit (ASIC), or one or more integrated circuits configured to control program execution of the solutions in this application.

The communication line 1303 may include a channel, to transmit information between the foregoing components.

The communication interface 1306 is an apparatus such as any transceiver, and is configured to communicate with another apparatus or a communication network, for example, the Ethernet.

The memory 1302 may be a read-only memory (ROM) or another type of static storage apparatus that can store static information and instructions, or a random access memory (RAM) or another type of dynamic storage apparatus that can store information and instructions, or may be an electrically erasable programmable read-only memory (EE-PROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium, another magnetic storage device, or any other medium that can be configured to carry or store expected program code in a form of an instruction or a data structure and that can be accessed by a computer. However, this is not limited thereto. The memory may exist independently, and is connected to the processor through the communication line 1303. The memory 1302 may alternatively be integrated into the processor 1301.

The memory 1302 is configured to store computer-executable instructions for performing the solutions in this application, and the computer-executable instructions are executed under control of the processor 1301. The processor 1301 is configured to execute the computer-executable instructions stored in the memory 1302, to implement the computing power resource scheduling method provided in the foregoing embodiment of this application.

Optionally, the computer-executable instructions in this embodiment of this application may also be referred to as application program code. This is not specifically limited in this embodiment of this application.

In a specific implementation, in an embodiment, the processor 1301 may include one or more CPUs, for example, a CPU 0 and a CPU 1 in FIG. 13.

In a specific implementation, in an embodiment, the communication device may include a plurality of processors, for example, a processor 1301 and a processor 1302 in FIG. 13. Each of the processors may be a single-core (single-CPU) processor, or may be a multi-core (multi-CPU) processor. The processor herein may be one or more apparatuses, circuits, and/or processing cores configured to process data (such as a computer program instruction).

The communication device may be a general-purpose apparatus or a dedicated apparatus. In a specific implementation, the communication device may be a portable computer, a mobile terminal, or the like, or an apparatus having a structure similar to that in FIG. 13. A type of the communication device is not limited in this embodiment of this application.

It should be noted that the processor 1301 in FIG. 13 may invoke the computer-executable instructions stored in the memory 1302, so that the first terminal device performs the method performed by the first terminal device in the method embodiments corresponding to FIG. 3 to FIG. 9a. The processor 1301 in FIG. 13 may invoke the computer-executable instructions stored in the memory 1302, so that the first device performs the method performed by the first device in the method embodiments corresponding to FIG. 3 to FIG. 9a. The processor 1301 in FIG. 13 may invoke the computer-executable instructions stored in the memory 1302, so that the second device performs the method performed by the second device in the method embodiments corresponding to FIG. 3 to FIG. 9a.

Specifically, a function/implementation process of the processing module 1102 in FIG. 11 may be implemented by the processor 1301 in FIG. 13 by invoking the computer-executable instructions stored in the memory 1302. A function/implementation process of the sending unit 1001 and the receiving unit 1002 in FIG. 10, the obtaining module 1101 and the sending module 1103 in FIG. 1i, and the first receiving module 1201 and the first sending module 1202 in FIG. 12 may be implemented by the communication interface 1306 in FIG. 13.

All or some of the foregoing embodiments may be implemented by using software, hardware, firmware, or any combination thereof. When software is used to implement embodiments, all or a part of embodiments may be implemented in a form of a computer program product.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When the software is used for implementation, all or some of embodiments may be implemented in a form of a computer program product.

The computer program product includes one or more computer instructions. When the computer-executable instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

The foregoing embodiments are merely intended for describing the technical solutions of this application, but not for limiting this application. Although this application is described in detail with reference to the foregoing embodiments, a person of ordinary skilled in the art should understand that modifications may still be made to the technical solutions described in the foregoing embodiments or equivalent replacements may be made to some technical features, and such modifications or replacements do not cause the essence of the corresponding technical solutions to depart from the spirit and scope of embodiments of this application.

What is claimed is:

1. A method, performed by a first terminal device or a chip on the first terminal device, wherein the method comprises:
   sending a computing power request message to a first device, wherein the computing power request message comprises computing plane resource indication information, and the computing plane resource indication information indicates a computing power requirement of the first terminal device; and receiving computing power configuration information from the first device, wherein the computing power configuration information comprises at least one of:
      first indication information, wherein the first indication information indicates a first computing power resource provided by the first device, or
      second indication information, wherein the second indication information indicates a second computing power resource provided by a second device,
   wherein whether the computing power configuration information comprises one or both of the first indication information or the second indication information is based on the computing plane resource indication information and a computing plane remaining computing resource of the first device, and
   wherein the first device is different from the second device.

2. The method according to claim 1, wherein the first device is a first base station, and the sending the computing power request message to the first device comprises:
   sending the computing power request message to the first device by using air interface radio resource control (RRC) signaling.

3. The method according to claim 1, wherein the first device is a core network device, and the sending the computing power request message to the first device comprises:
   sending the computing power request message to the first device by using non-access stratum (NAS) signaling.

4. The method according to claim 1, wherein the computing plane resource indication information comprises one or more of a computing power size, an execution time, a computing power task type, a computing model, a computing algorithm, an execution result transmission trigger type, or a trigger type.

5. The method of claim 4, the computing model comprising a protocol-predefined model, download address information of the computing model indicated by a model identifier.

6. The method of claim 4, the trigger type being at least one of periodic execution, execution of an RRM event, or a change in an RRC state of the first terminal device.

7. The method according to claim 1, wherein the sending the computing power request message is responsive to the first terminal device determining that a computing plane resource of the first terminal device is insufficient to support artificial intelligence (AI) collaboration with another network device.

8. A method, performed by a first device or a chip on the first device, wherein the method comprises:
   receiving a computing power request message from a first terminal device, wherein the computing power request message comprises computing plane resource indication information, and the computing plane resource indication information indicates a computing power requirement of the first terminal device;
   determining a first computing power resource based on the computing plane resource indication information and a computing plane remaining computing resource of the first device; and
   sending computing power configuration information to the first terminal device, wherein the computing power configuration information comprises at least one of:
      first indication information, wherein the first indication information indicates the first computing power resource provided by the first device, or second indication information, wherein the second indication information indicates a second computing power resource provided by a second device, wherein whether the computing power configuration information comprises one or both of the first indication information or the second indication information is based on the computing plane resource indication information and the computing plane remaining computing resource of the first device, and wherein the first device is different from the second device.

9. The method according to claim 8, wherein the method further comprises:

sending a computing power transfer request message to the second device, to indicate the computing power requirement of the first terminal device or a computing power requirement of the first device; and receiving a computing power transfer acknowledgment message from the second device, wherein the computing power transfer acknowledgment message comprises the second indication information.

10. The method according to claim 9, wherein the first device comprises a first base station, and the second device comprises a second base station, and the sending the computing power transfer request message to the second device comprises:

sending the computing power transfer request message to the second device by using X2 interface signaling.

11. The method according to claim 10, wherein the first device is the first base station, and the receiving the computing power request message from the first terminal device comprises:

receiving the computing power request message from the first terminal device by using air interface radio resource control (RRC) signaling.

12. The method according to claim 9, wherein the first device comprises a first base station, and the second device comprises a core network device, and the sending the computing power transfer request message to the second device comprises:

sending the computing power transfer request message to the second device by using N2 interface signaling.

13. The method according to claim 9, wherein the first device is a core network device, and the second device comprises a first base station; and the receiving the computing power request message from the first terminal device comprises:

receiving the computing power request message from the first terminal device by using non-access stratum (NAS) signaling.

14. The method according to claim 8, wherein the computing plane resource indication information comprises one or more of a computing power size, an execution time, a computing power task type, a computing model, a computing algorithm, an execution result transmission trigger type, or a trigger type.

15. The method of claim 14, the computing model comprising a protocol-predefined model, download address information of the computing model indicated by a model identifier.

16. The method of claim 14, the trigger type being at least one of periodic execution, execution of an RRM event, or a change in an RRC state of the first terminal device.

17. A method, performed by a second device or a chip on the second device, wherein the method comprises:

receiving a computing power transfer request message from a first device, wherein the first device is a network device;

determining a second computing power resource based on the computing power transfer request message and a computing plane remaining computing resource of the second device; and sending a computing power transfer acknowledgment message to the first device, wherein the computing power transfer acknowledgment message comprises second indication information, and the second indication information indicates the second computing power resource provided by the second device to a terminal device, the computing power transfer acknowledgment message causing the first device to perform:

sending, to the terminal device, computing power configuration information, wherein the computing power configuration information comprises at least one of:

first indication information, wherein the first indication information indicates a first computing power resource provided by the first device, or the second indication information, wherein whether the computing power configuration information comprises one or both of the first indication information or the second indication information is based on computing plane resource indication information and a computing plane remaining computing resource of the first device, the computing plane resource indication information indicating a computing power requirement of the terminal device, and wherein the first device is different from the second device.

18. The method according to claim 17, wherein the first device comprises a first base station, and the second device comprises a second base station, and the receiving the computing power transfer request message from the first device comprises:

receiving the computing power transfer request message from the first device by using X2 interface signaling.

19. The method according to claim 17, wherein the first device comprises a first base station, the second device comprises a core network device, and the receiving the computing power transfer request message from the first device comprises:

receiving the computing power transfer request message from the first device by using N2 interface signaling.

* * * * *